United States Patent
Osler et al.

(10) Patent No.: US 9,874,237 B1
(45) Date of Patent: Jan. 23, 2018

(54) SUPPORT ASSEMBLY JOINT AND APPLICATIONS THEREOF

(71) Applicants: Turner Osler, Colchester, VT (US); Matthew Flego, Burlington, VT (US); Erik Cooper, Burlington, VT (US)

(72) Inventors: Turner Osler, Colchester, VT (US); Matthew Flego, Burlington, VT (US); Erik Cooper, Burlington, VT (US)

(73) Assignee: Kinetic Furniture of Vermont LLC, Colchester, VT (US)

( * ) Notice: Subject to any disclaimer, the term of this patent is extended or adjusted under 35 U.S.C. 154(b) by 0 days.

(21) Appl. No.: 15/275,626

(22) Filed: Sep. 26, 2016

Related U.S. Application Data

(63) Continuation of application No. PCT/US2016/050348, filed on Sep. 6, 2016.

(51) Int. Cl.
*A47C 7/02* (2006.01)
*A47C 3/02* (2006.01)
(Continued)

(52) U.S. Cl.
CPC ............. *F16B 12/44* (2013.01); *A47B 3/06* (2013.01); *A47B 13/02* (2013.01); *A47C 3/02* (2013.01);
(Continued)

(58) Field of Classification Search
CPC ......... Y10T 403/4694; Y10T 403/4634; Y10T 403/46; Y10T 403/4602; Y10T 403/4628; Y10T 403/4648; A47C 9/002; A47C 7/002; A47C 4/021; A47B 3/06; A47B 13/02; A47B 2230/16; A47B 2013/026; F16B 12/44; F16B 12/22
(Continued)

(56) References Cited

U.S. PATENT DOCUMENTS

| 401,798 A | * | 4/1889 | Spencer | ................. A63G 11/00 297/440.13 |
| 409,893 A | * | 8/1889 | Wray | ...................... F16G 11/10 403/182 |

(Continued)

FOREIGN PATENT DOCUMENTS

| DE | 296 07 150 U1 | 8/1996 |
| DE | 297 04 664 U1 | 5/1997 |

(Continued)

OTHER PUBLICATIONS

"Gaiam Balance Ball Chair", Retrieved on Jul. 28, 2015 from http://www.amazon.com/Gaiam-Balance-Ball-Chair-Black/dp/B0007VB4NE/ref=sr_1_1?ie=UTF8&qid=1438110802&sr=8-1&keywords=gaiam+stability+ball+chair, Jul. 28, 2015.
(Continued)

*Primary Examiner* — Rodney B White
(74) *Attorney, Agent, or Firm* — Justin W. McCabe; Dunkiel Saunders Elliott Raubvogel & Hand PLLC

(57) ABSTRACT

A support assembly for easy assembly and reliable operation is disclosed. Support assembly includes a plurality of support members, with at least one support member including connecting slot and at least one other support member having a complementary slot. Each slot features at least two tapered faces or walls to provide a wedge effect that ensures a tight reliable fit when the two members are fitted together.

30 Claims, 25 Drawing Sheets

(51) Int. Cl.

| | | |
|---|---|---|
| *F16B 12/44* | (2006.01) | |
| *F16M 11/22* | (2006.01) | |
| *A47C 9/00* | (2006.01) | |
| *A47C 7/00* | (2006.01) | |
| *A47C 4/02* | (2006.01) | |
| *A47B 3/06* | (2006.01) | |
| *F16B 12/54* | (2006.01) | |
| *A47B 13/02* | (2006.01) | |

(52) U.S. Cl.
CPC .............. *A47C 4/021* (2013.01); *A47C 7/002* (2013.01); *A47C 9/002* (2013.01); *F16B 12/54* (2013.01); *F16M 11/22* (2013.01); *A47B 2013/026* (2013.01); *A47B 2230/16* (2013.01)

(58) Field of Classification Search
USPC ............ 297/258.1, 259.1, 271.1, 271.2, 313, 297/440.13, 451.8, 440.1, 440.14, 440.22; 482/139, 131, 132, 142, 146
See application file for complete search history.

(56) References Cited

U.S. PATENT DOCUMENTS

| | | | | |
|---|---|---|---|---|
| 1,039,134 A * | 9/1912 | Jenkins | ................... | A47B 11/00 108/139 |
| 1,393,679 A * | 10/1921 | Forster | ..................... | A47B 3/12 108/158.12 |
| 1,903,631 A * | 4/1933 | Morrison | ................. | A47B 3/12 108/150 |
| 1,940,117 A * | 12/1933 | Carpos | ..................... | A47B 3/06 108/157.18 |
| 2,000,915 A * | 5/1935 | Blake | ....................... | A47B 3/06 108/118 |
| 2,107,178 A * | 2/1938 | May | .......................... | A47F 7/06 211/33 |
| 2,235,290 A * | 3/1941 | Exline | ...................... | A47B 3/06 108/159 |
| 2,347,821 A * | 5/1944 | Goldner | ................. | A47C 4/021 297/440.13 X |
| 2,444,991 A * | 7/1948 | Hunter | ................... | A47C 4/021 297/440.13 |
| 2,456,964 A * | 12/1948 | Ledure | .................... | A47F 7/06 297/440.13 X |
| 2,628,668 A * | 2/1953 | Basile | ...................... | A47C 4/021 297/440.13 X |
| 2,640,527 A * | 6/1953 | Kreizelman | ............. | A47C 4/02 297/440.13 X |
| 3,338,189 A * | 8/1967 | Xavier | ..................... | A47C 4/021 108/159 |
| 3,396,933 A * | 8/1968 | Ward | ...................... | A47B 13/04 297/440.13 X |
| 3,407,001 A * | 10/1968 | Minsker | ................. | A47C 4/021 297/440.13 |
| 3,572,824 A * | 3/1971 | Schupbach | .............. | A47B 3/14 297/440.13 X |
| 3,663,058 A * | 5/1972 | Hirsch | ...................... | A47C 4/02 297/423.41 |
| 3,867,047 A * | 2/1975 | Wightman | ............ | F16B 17/008 403/186 |
| 4,084,517 A * | 4/1978 | Guess | ....................... | A47B 3/06 297/440.13 X |
| 4,089,560 A * | 5/1978 | de Mattos | ................ | A47C 4/03 297/440.11 |
| 4,100,952 A * | 7/1978 | Neudorfer | .............. | A47B 13/04 144/350 |
| 4,109,588 A * | 8/1978 | Powers | ................... | A47B 9/00 108/12 |
| 4,169,625 A * | 10/1979 | Petersen | ................. | A47C 4/02 297/440.22 X |
| 4,267,998 A * | 5/1981 | Weirich | ................... | A47B 3/06 108/158.12 |
| 4,552,404 A | 11/1985 | Congleton | | |
| 4,974,906 A * | 12/1990 | Hines | ..................... | A47C 4/028 297/440.13 |
| 5,004,587 A | 9/1991 | Degen | | |
| 5,113,851 A | 5/1992 | Gamba | | |
| 5,253,933 A * | 10/1993 | Walker | ................... | H04R 1/026 181/199 |
| 5,379,975 A * | 1/1995 | Berkowitz | ............. | A47B 13/06 297/440.1 X |
| 5,419,615 A | 5/1995 | Dozsa-Farkas | | |
| 5,590,930 A | 1/1997 | Glockl | | |
| 5,873,628 A | 2/1999 | Allard et al. | | |
| 5,913,568 A | 6/1999 | Brightbill et al. | | |
| 6,206,335 B1 | 3/2001 | Huber et al. | | |
| 6,481,795 B1 | 11/2002 | Pettibon | | |
| 6,616,238 B1 | 9/2003 | Guery-Strahm | | |
| 6,945,920 B1 * | 9/2005 | Kemery | ............. | A63B 21/0004 482/146 |
| 7,093,900 B1 | 8/2006 | Schon | | |
| 7,160,235 B2 | 1/2007 | McNally et al. | | |
| 7,374,517 B2 | 5/2008 | Lockett | | |
| 7,585,028 B2 | 9/2009 | Jenkins | | |
| 7,686,396 B2 | 3/2010 | Schaaf | | |
| 7,922,247 B2 | 4/2011 | Dickie | | |
| 8,007,417 B2 | 8/2011 | Heller | | |
| 8,056,976 B1 | 11/2011 | Polk | | |
| 8,225,726 B1 * | 7/2012 | Fineberg | .................. | A47B 3/06 108/115 |
| 8,678,985 B2 | 3/2014 | Mattox | | |
| 8,919,881 B2 | 12/2014 | Bay | | |
| 8,998,319 B2 | 4/2015 | Bahneman et al. | | |
| 9,474,363 B1 * | 10/2016 | Orsini | ..................... | A47B 3/06 |
| 2004/0009859 A1 * | 1/2004 | Gottlieb | ............. | A63B 21/0004 482/146 |
| 2006/0097555 A1 | 5/2006 | Meleger | | |
| 2008/0245281 A1 * | 10/2008 | Willy | ................... | A47B 13/003 108/157.16 |
| 2010/0276971 A1 * | 11/2010 | Maxwell | ................ | A47C 4/028 297/440.13 X |
| 2012/0251232 A1 * | 10/2012 | Clark | .................... | E06B 3/9642 403/335 |
| 2013/0053228 A1 * | 2/2013 | Winegar | ................ | A63B 22/16 482/146 |
| 2013/0150220 A1 | 6/2013 | Chen | | |
| 2014/0045664 A1 | 2/2014 | Hockridge et al. | | |
| 2014/0165289 A1 * | 6/2014 | Trocchia | ................ | A47D 1/006 297/451.8 X |
| 2014/0210249 A1 | 7/2014 | Barnett | | |
| 2014/0378283 A1 * | 12/2014 | Qiu | ........................ | A63B 26/00 482/142 |
| 2015/0076871 A1 * | 3/2015 | Werner | .................... | A47C 9/10 297/440.1 X |

FOREIGN PATENT DOCUMENTS

| | | | | |
|---|---|---|---|---|
| DE | 201 10 832 U1 | 11/2001 | | |
| DE | 20 2009 004382 U1 | 7/2009 | | |
| GB | 2151473 A * | 7/1985 | ............. | A47C 4/021 |
| IL | GB 2264229 A * | 8/1993 | ............... | A47C 4/02 |
| WO | 2014038958 A1 | 3/2014 | | |

OTHER PUBLICATIONS

"Pettibon System Therapeutic Wobble Chair", Retrieved Jul. 28, 2015 from http://web.archive.org/web/20130805155721/http://pettibonsystem.com/product/wobble-therapeutic-chair, Aug. 5, 2013.

"Sivan Health and Fitness Balance Ball Fit Chair Base with Ball and Pump", Retrieved on Jul. 28, 2015 from http://www.amazon.com/Sivan-Health-Fitness-Balance-Chair/dp/B00IYUREDY/ref=sr_1_8?e=UTF8&qid=1438110802&sr=8-8&keywords=gaiam+stability+ball+chair, Jul. 28, 2015.

"Zenergy Ball Chair", Retrieved on Jul. 28, 2015 from https://www.schooloutfitters.com/catalog/product_info/pfam_id/PFAM45345/products_id/PRO58109, Jul. 28, 2015.

Kowalewski, "Wedge Side Tables", DesignBoom. Retrieved from URL:http://www.designboom.com/readers/wedge-side-tables-by-

(56) References Cited

OTHER PUBLICATIONS andreas-kowalewski/, Apr. 18, 2012.
Lehe, "European Search Report", related to European Union Application No. EP 16 18 0094, dated, Nov. 16, 2016.
McCabe, "Response to Office Action", related to U.S. Appl. No. 14/947,675, dated Jun. 20, 2017.
Nguyen, "First Office Action", related to U.S. Appl. No. 14/947,675, dated, Mar. 20, 2017.
Schiffer, "In response to communication pursuant to Rule 96 EPC", related to European Application No. 16 180 094.1, Jul. 25, 2017.
Thomas, "International Search Report and Written Opinion", regarding International Application No. PCT/US16/50348, dated Nov. 18, 2016.

* cited by examiner

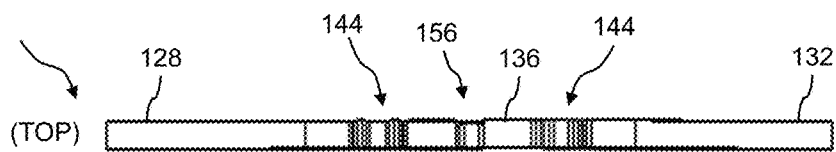
*FIG. 11A*
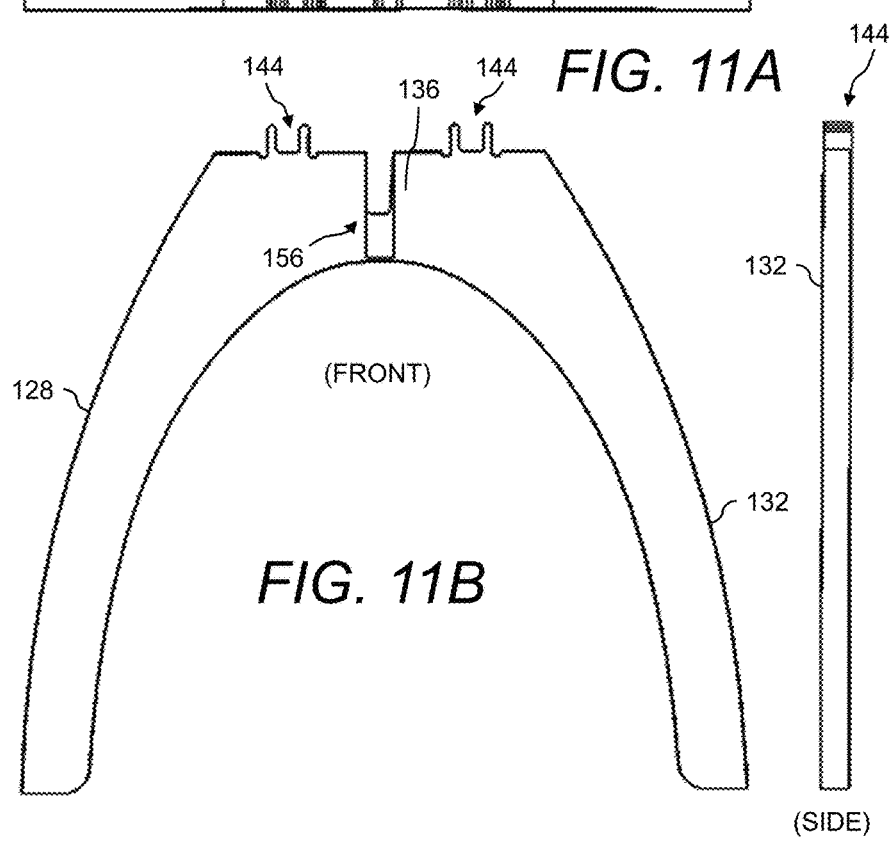
*FIG. 11B*
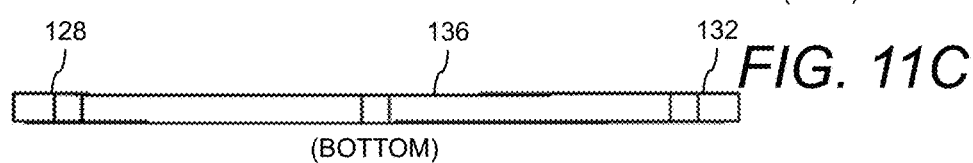
*FIG. 11C*
*FIG. 11D*

SUPPORT ASSEMBLY JOINT AND APPLICATIONS THEREOF

RELATED APPLICATION DATA

This application is a continuation of International Application No. PCT/US2016/050348, filed on Sep. 6, 2016, and titled "Support Assembly Joint and Applications Thereof", the entire disclosure of which is hereby fully incorporated by reference herein in its entirety.

FIELD OF THE INVENTION

The present invention generally relates to support assembly systems and methods. In particular, the present invention is directed to a Support assembly Joint and Applications Thereof.

BACKGROUND

Furniture can be assembled in a many different ways—ways that include fasteners, glues, snaps, clips, straps, and mating joints. Many of these methods are portrayed as available to the "do-it-yourselfer" and as such are especially popular with flat-pack furniture (i.e., furniture that is principally made of shaped flat plates that are joined together). However, despite the best efforts of manufacturers, such self-assembly furniture can often be complicated to assemble, and most items require tools to put the furniture together. Moreover, often the assembly method compromises the integrity of the furniture (which is not typically made of hardwood, but instead is engineered lumber that has limited ability to maintain its integrity when screwed into), which ultimately results in failure of the furniture for its intended use. Accordingly, furniture that can be assembled and disassembled by hand, without tools or glue or other mechanisms, while still providing significant resistance to lateral and rotational movement has proved elusive.

SUMMARY OF THE DISCLOSURE

In a first exemplary aspect a support assembly is disclosed, the support assembly comprising: a first support member including a first slot, the first slot including a first tapered region and a second tapered region, wherein the first tapered region abuts the second tapered region; and a second support member including an second slot, the second slot including a third tapered region and a fourth tapered region, wherein the third tapered region abuts the fourth tapered region, and wherein assembly of the first slot and the second slot results in an intersecting joint capable of resisting lateral and rotation movement of the first support member and the second support member relative to one another.

In another exemplary aspect a chair is disclosed, the chair comprising: a first support member including a first slot, the second slot including a first tapered region and a second tapered region, wherein the first tapered region abuts the second tapered region; a second support member including an second slot, the second slot including a third tapered region and a fourth tapered region, wherein the third tapered region abuts the fourth tapered region, wherein assembly of the first slot and the second slot results in an intersecting joint capable of resisting lateral and rotation movement of the first support member and the second support member relative to one another; a base plate coupled to the first support member and the second support member; a seat for a user; and a rocking mechanism coupled to the base plate and the seat, the rocking mechanism capable of inducing lateral, longitudinal, and transverse deflection of the seat when in use by the user.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 11A-11E illustrate various other views of the exemplary second support member shown in FIG. 10;

FIG. 12B-1 is a perspective view of the back of an upper portion suitable for use with the upper portion shown in FIG. 12A according to an embodiment of the present invention;

FIG. 12B-2 is a perspective view of another back of an upper portion suitable for use with the upper portion shown in FIG. 12A according to an embodiment of the present invention;

FIG. 14B-1 is a perspective view of the back of an upper portion suitable for use with the upper portion shown in FIG. 14A according to an embodiment of the present invention;

FIG. 14B-2 is a perspective view of another back of an upper portion suitable for use with the upper portion shown in FIG. 14A according to an embodiment of the present invention;

DESCRIPTION OF THE DISCLOSURE

Figure 1:
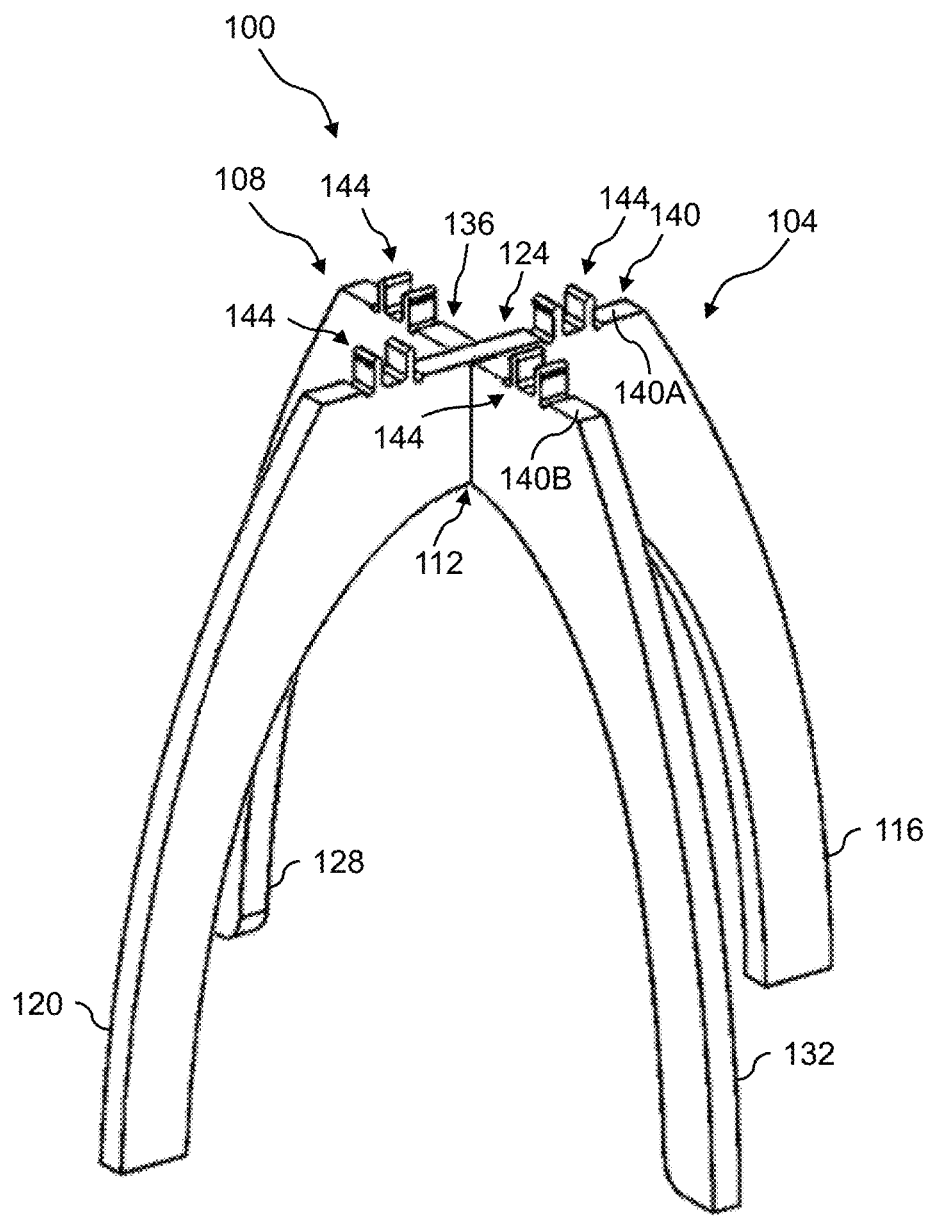
FIG. 1 is a perspective view of an exemplary support assembly according to an embodiment of the present invention.

The presently disclosed subject matter now will be described more fully hereinafter with reference to the accompanying figures, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated figures. Therefore, it is to be understood that the presently disclosed subject matter is not to be limited to the specific embodiments disclosed and that modifications and other embodiments are intended to be included within the scope of the appended claims.

A support assembly joint according to the present disclosure provides for easy assembly and reliably secures together structural members, such as table legs, bedframes, etc. A support assembly joint designed as described herein is suitable, for example, for use with any type of build-it-yourself or flat pack furniture where two of the pieces require a generally fixed assembly. In exemplary embodiments, the support assembly joint is formed when two structural members have cooperating multiple tapered regions so as to form a joint that is resistant to lateral and rotational movement, but does not require the use of tools, fasteners, or adhesives to assemble. As discussed in more detail below, in order to form the joint, a first structural member includes at least one downward facing slot having a plurality of tapered regions and a second structure member includes an upward facing slot having a plurality of cooperative tapered region. When assembled together, the two slots are mated and the resulting compression fit is sufficient alone to provide a stiff strong joint without the need, for example, for glue or fasteners.

A support assembly joint as disclosed herein can be useful for assembling most any structure in which two members need to be joined and multiple joints can be positioned on any single structural member to allow for the assembly of variously configured furniture items or portions thereof. For example, a first structural member can have a downward facing slot (as discussed in more detail below) proximate each end of the member to allow for mating with two other structural members that have upward facing slots. As such, the support assembly disclosed herein can be used in many applications, such as, but not limited to, furniture, bed frames, cabinets, plant holders, and the like.

Referring now to FIGS. 1 to 4, there is shown a support assembly 100, in the form of an exemplary chair or stool base, according to an embodiment of the present invention. In this embodiment, support assembly 100 includes a first support member 104 coupled to a second support member 108 by an intersecting joint 112 (discussed in more detail below with respect to, for example, FIG. 16). As shown, first support member 104 includes a leg 116 and a leg 120 that are bridged by a substantially horizontal cross-member 124 and second support member 108 includes a leg 128 and a leg 132 that are coupled by a substantially horizontal cross-member 136.

First support member 104 and second support member 108 of the presently disclosed support assembly 100 can be formed of any strong, rigid, lightweight material, such as, but not limited to, wood, wood laminate, composite wood or any other composite material, polyvinyl chloride (PVC) material, metal (e.g., aluminum, steel), and the like. Further, depending on the application, first support member 104 and second support member 108 can be solid members or hollow members. Moreover, and as discussed above, although only two support members are shown in the figures, the support assembly joint discussed herein can be used with most any number of support members.

In an exemplary embodiment, cross-member 124 and cross-member 136 each include upper surfaces 140 (140A and 140B) that are generally flat save for the inclusion of attachment features 144 that extend away from the upper surfaces of each cross-member. The configuration of upper surfaces 140 and attachment features 144 is such as to allow support assembly 100 to engage with corresponding receiving features (e.g., receiving feature 204 (FIG. 17A) and receiving feature 212 (FIG. 17B)) of an item or member to be supported atop the base, such as, but not limited to, a chair seat, a stool seat, a tabletop, and the like. Attachment features 144 can be, for example, resilient finger-like features or block-like features (see FIG. 18).

First support member 104 and second support member 108 are coupled together at an intersecting joint 112, with each support member being configured to contribute to the intersecting joint so as to make it stable and secure without the need for fasteners or adhesives. The description of the features that create intersection joint 112 is further below with reference to FIGS. 5 to 16. Moreover, more details of first support member 104 are shown and described below with reference to FIG. 8 through FIG. 9E, while more details of second support member 108 are shown and described below with reference to FIG. 10 through FIG. 11E.

Figure 5:
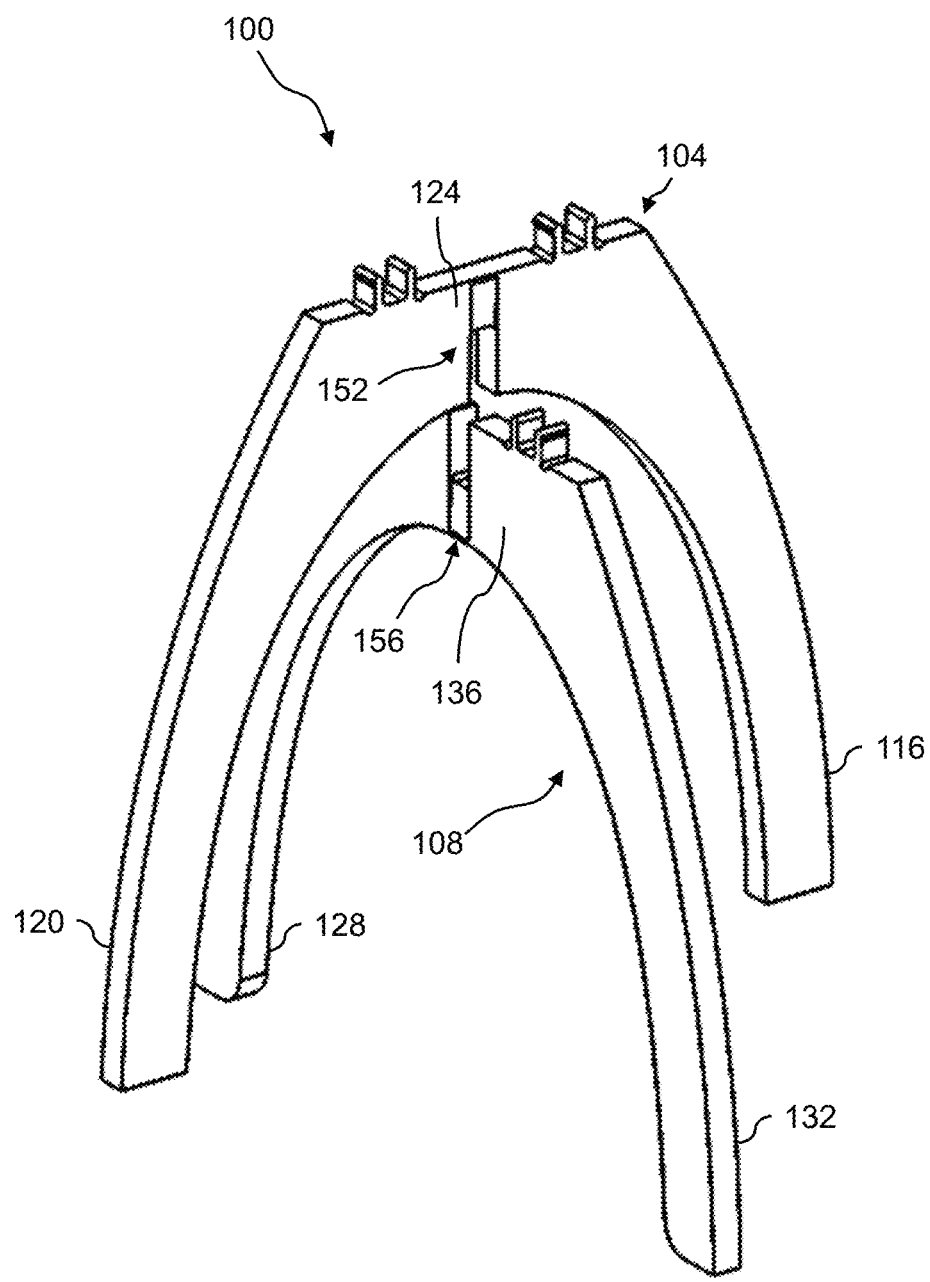
FIG. 5 is an exploded perspective view of an exemplary support assembly according to an embodiment of the present invention.
Figure 6:
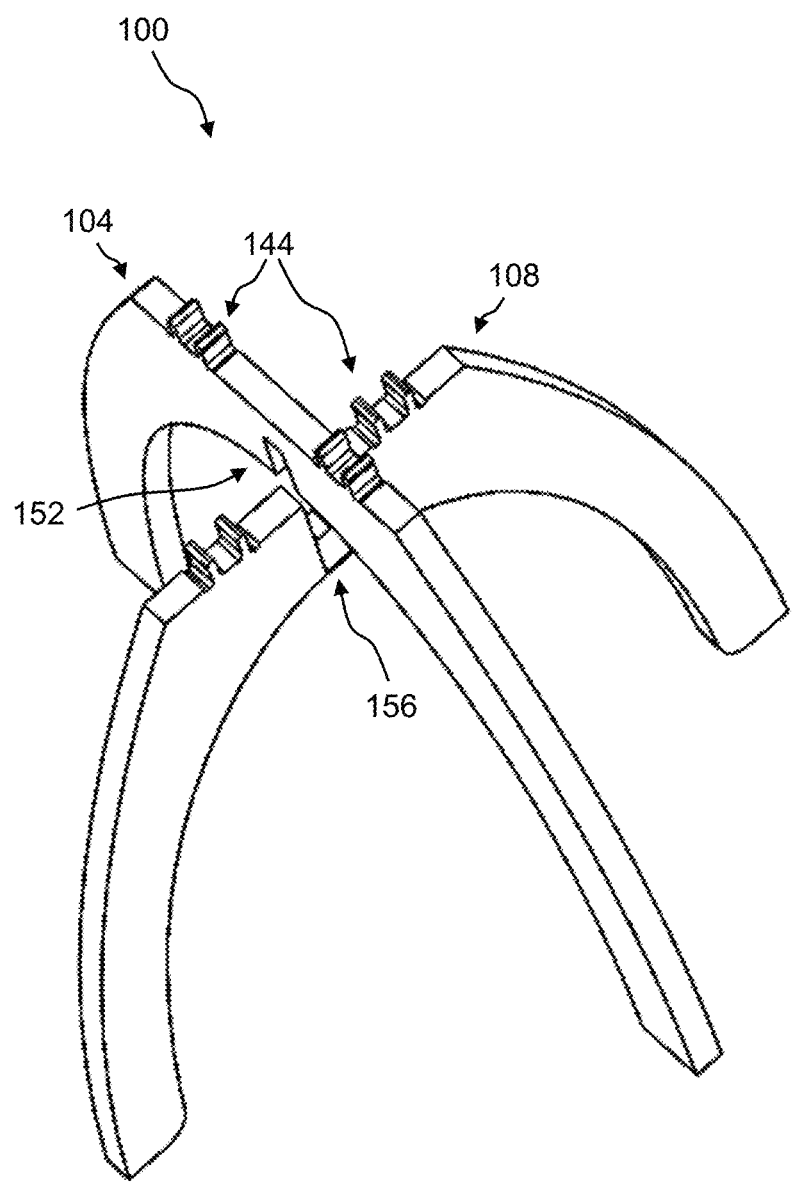
FIG. 6 is an exploded perspective view of an exemplary support assembly according to an embodiment of the present invention.
Figure 7:
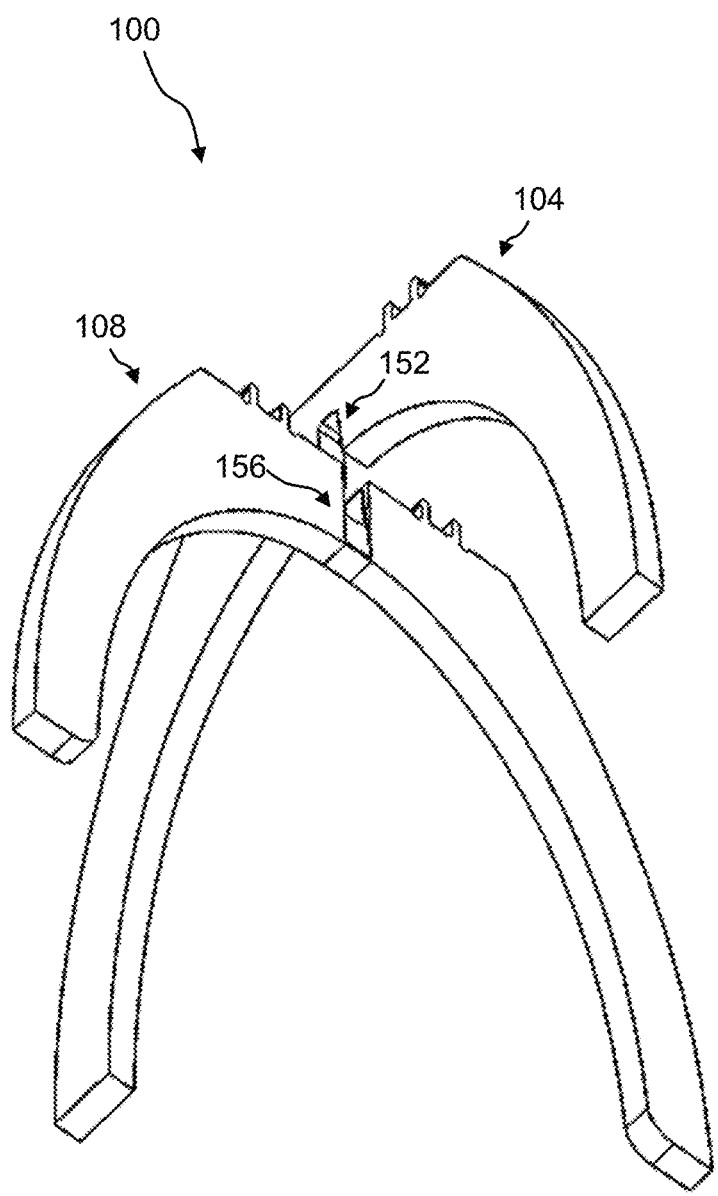
FIG. 7 is an exploded perspective view of an exemplary support assembly according to an embodiment of the present invention.

Turning now to a discussion of FIGS. 5 to 7 that show various exploded perspective views of exemplary support assembly 100. In particular, FIGS. 5 to 7 show the alignment of a downward-facing slot 152 (formed in first support member 104) with respect to upward-facing slot 156 (formed in second support member 108). Downward-facing slot 152 and upward-facing slot 156 are sized and configured to mate so as to form intersecting joint 112. In an exemplary embodiment, upward-facing slot 156 and downward-facing slot 152 each include three tapered regions that cooperatively mate to form a joint that resists lateral and rotational movement and is assembled without tools, fasteners, or adhesives.

Figure 8:
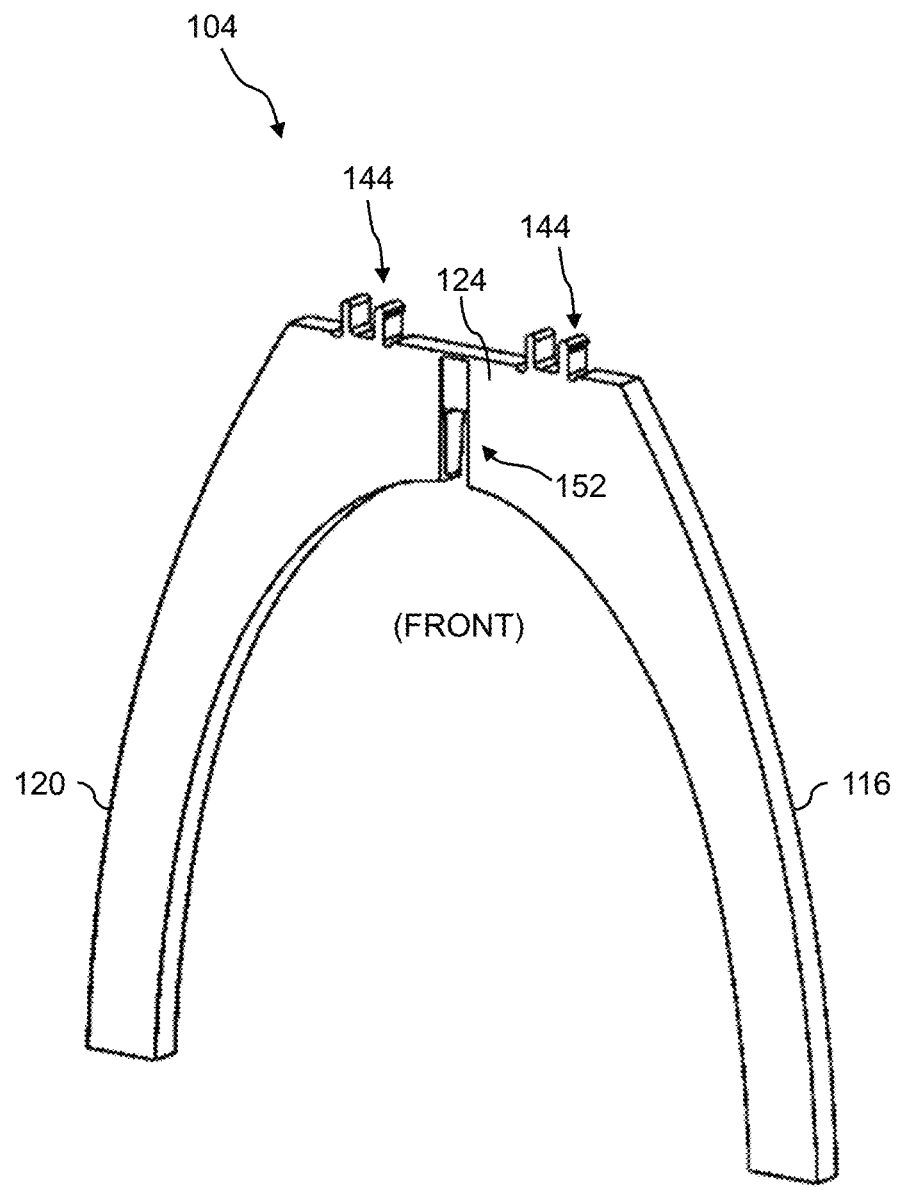
FIG. 8 illustrates a perspective view of an exemplary first support member according to an embodiment of the present invention.
Figures 9A, 9B, 9C, 9D:
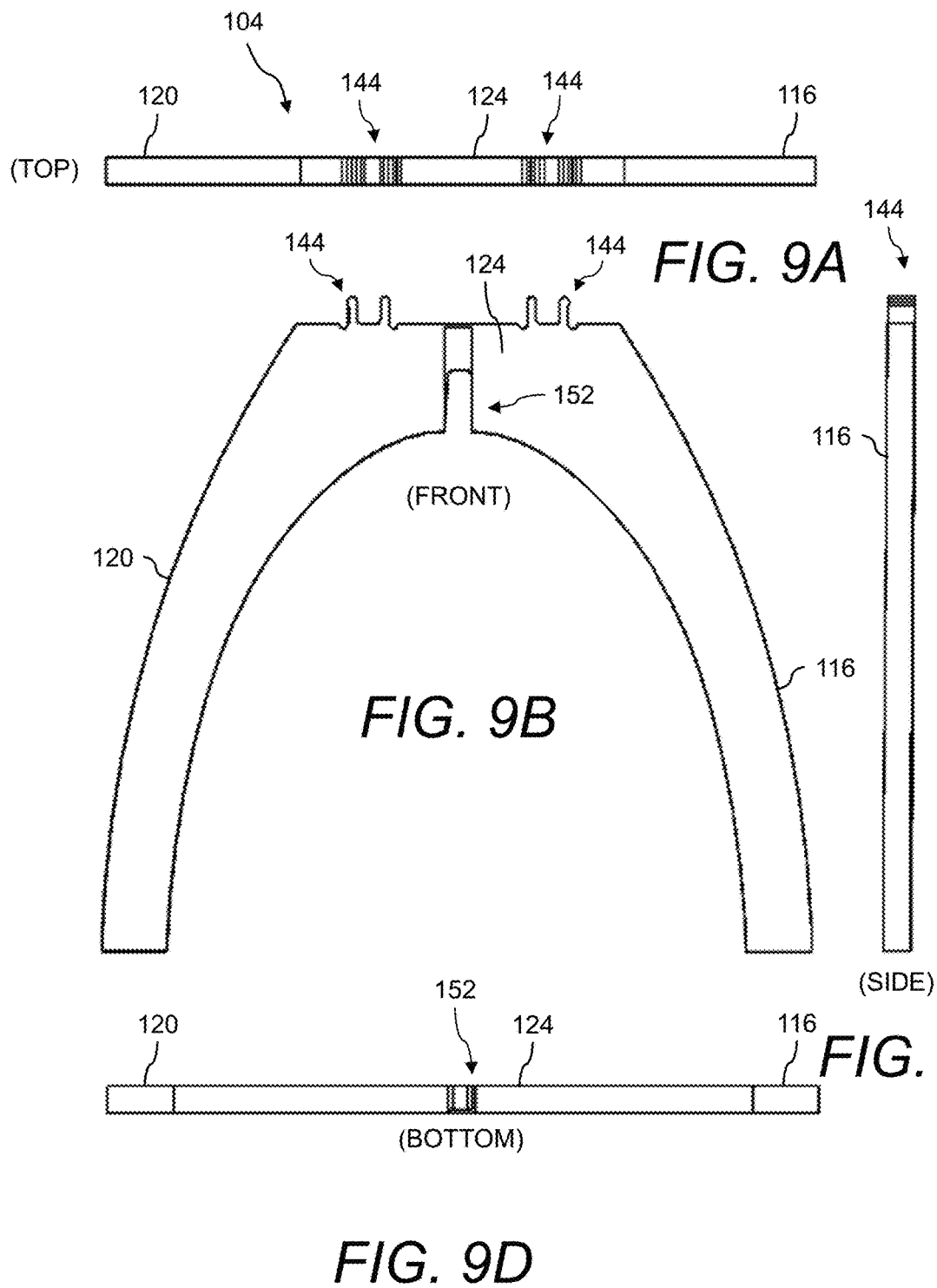
FIGS. 9A-9E illustrate various other views of the exemplary first support member shown in FIG. 8.
Figure 9E:
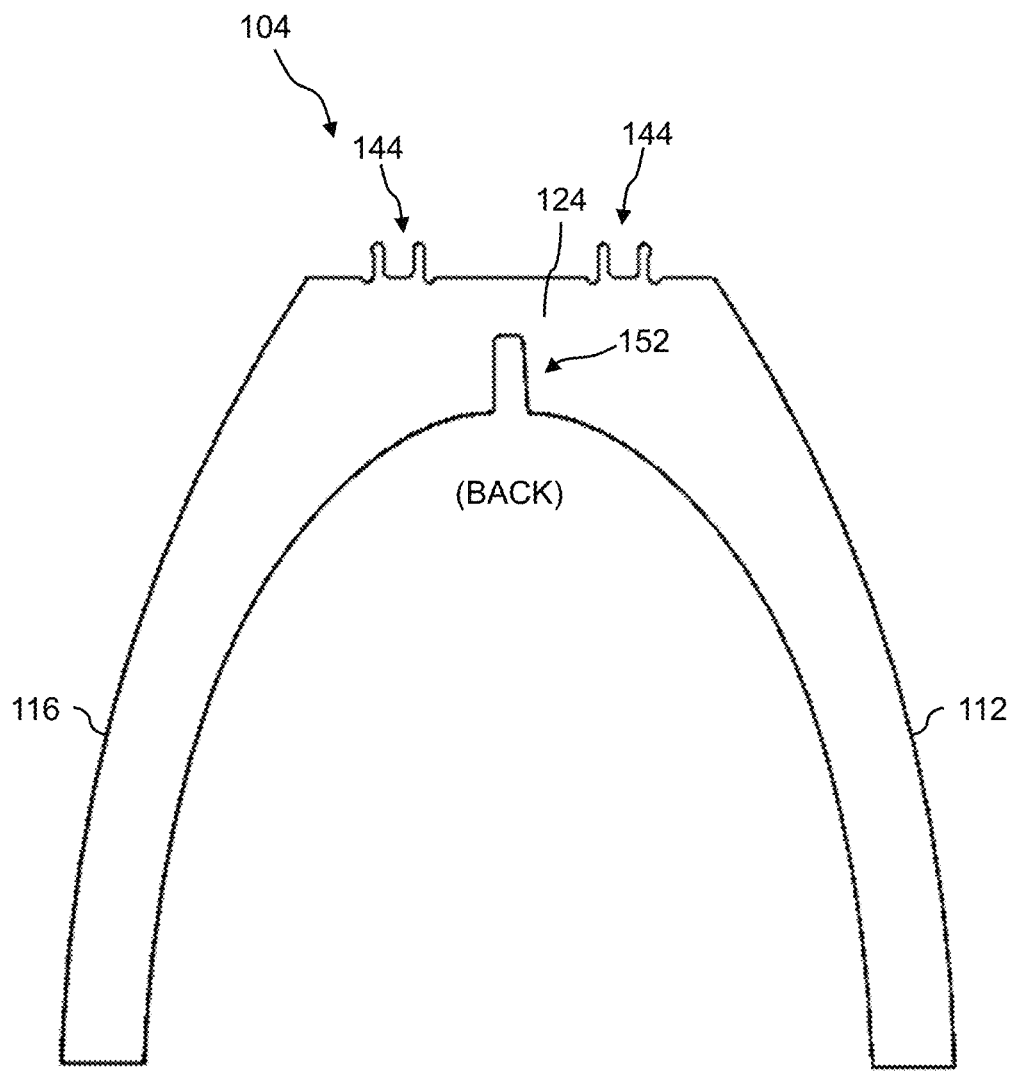
Figure 12A:
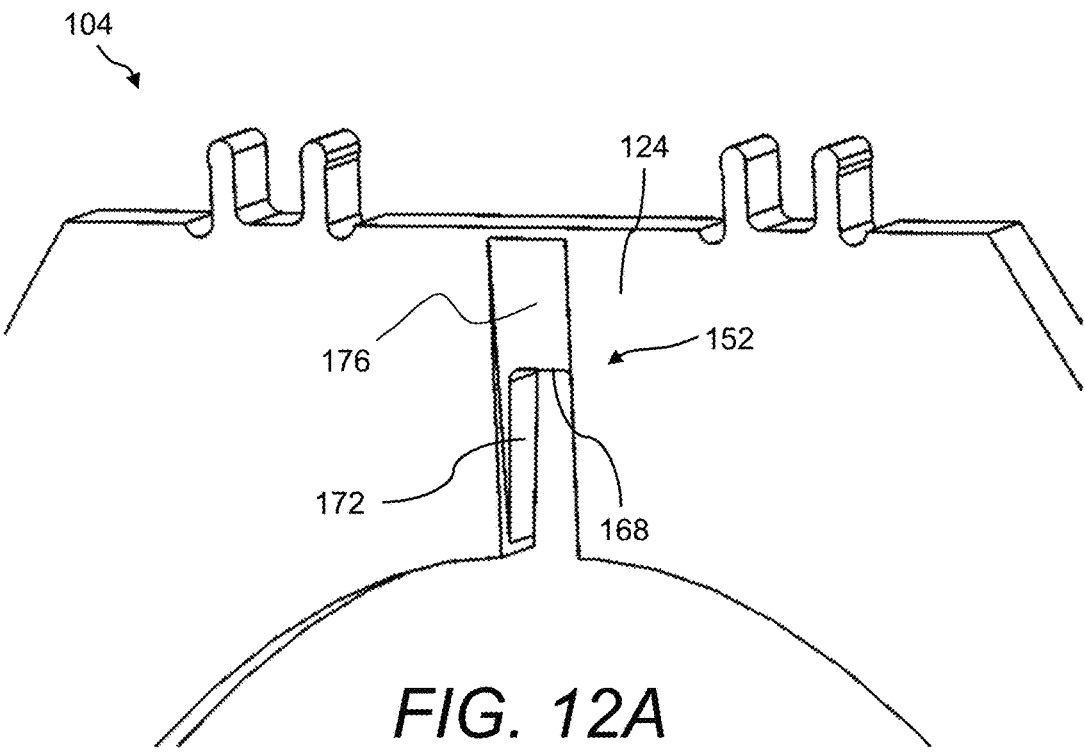
FIG. 12A is a perspective view of the front of an upper portion of the exemplary first support member shown in FIG. 8.
Figures 1, 12B:
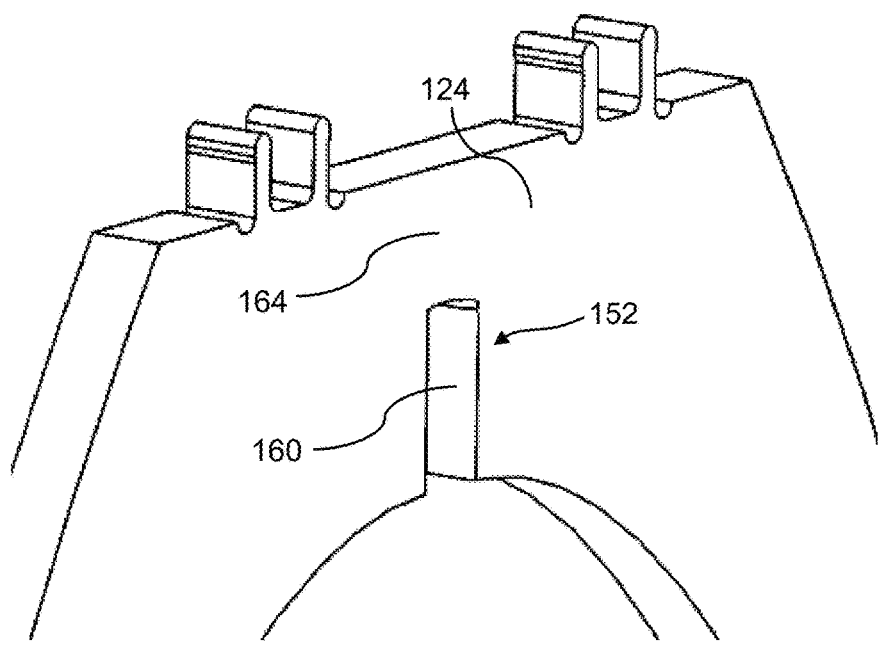
Figures 2, 12B:
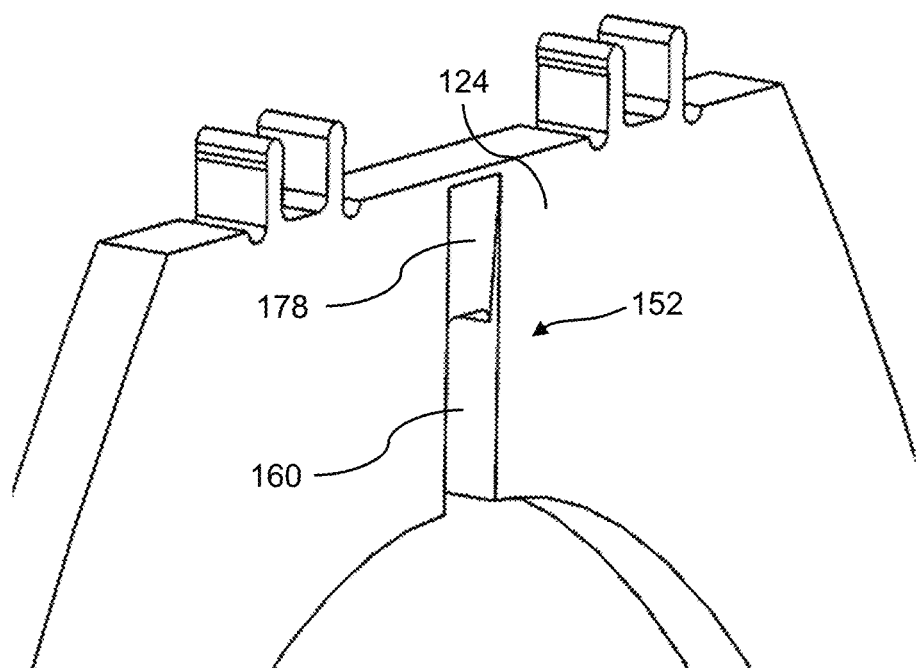
Figure 13:
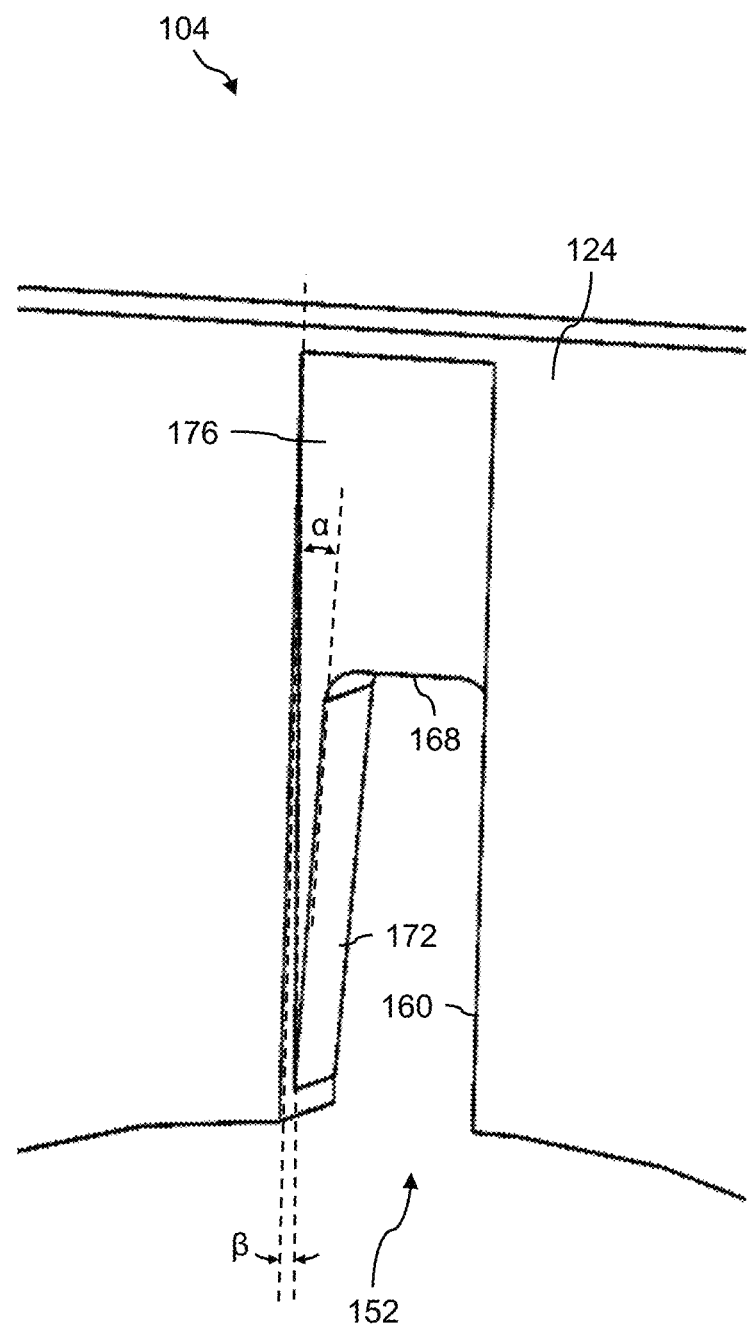
FIG. 13 is another perspective view of an upper portion of the exemplary first support member shown in FIG. 8.

FIGS. 8 to 9E are various views of an exemplary first support member 104. FIGS. 12A, 12B, and 13 are enlarged perspective views of an upper portion of first support member 104, with a focus on downward-facing slot 152.

Figure 10:
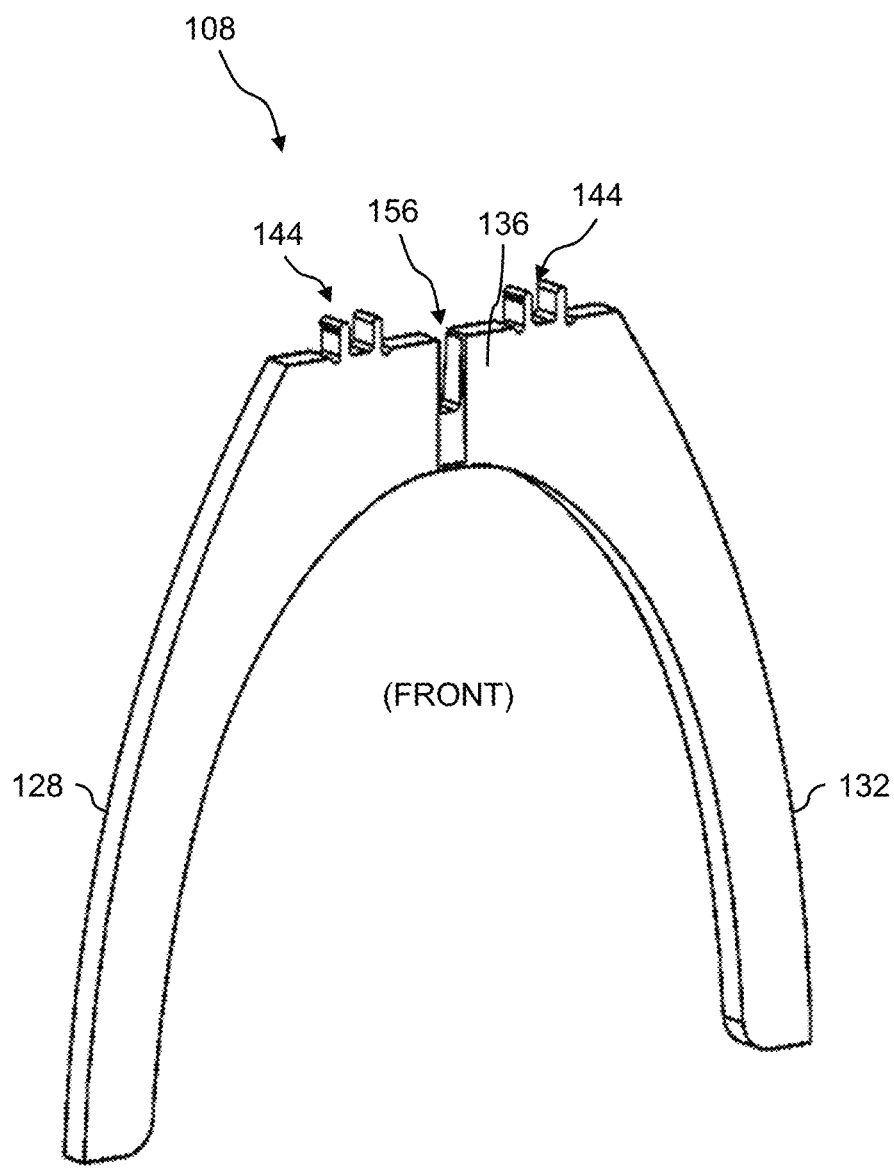
FIG. 10 illustrates a perspective view of an exemplary second support member according to an embodiment of the present invention.
Figure 11E:
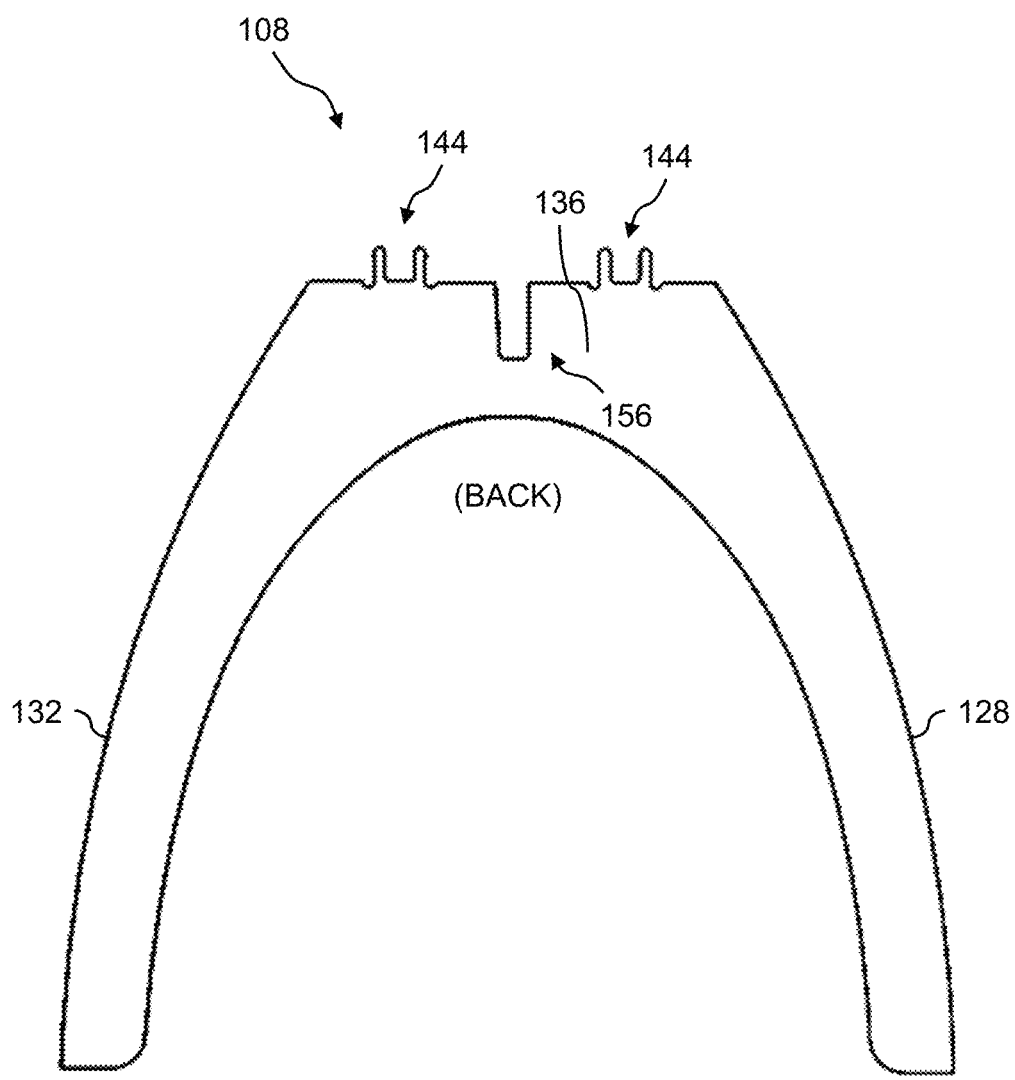
Figure 14A:
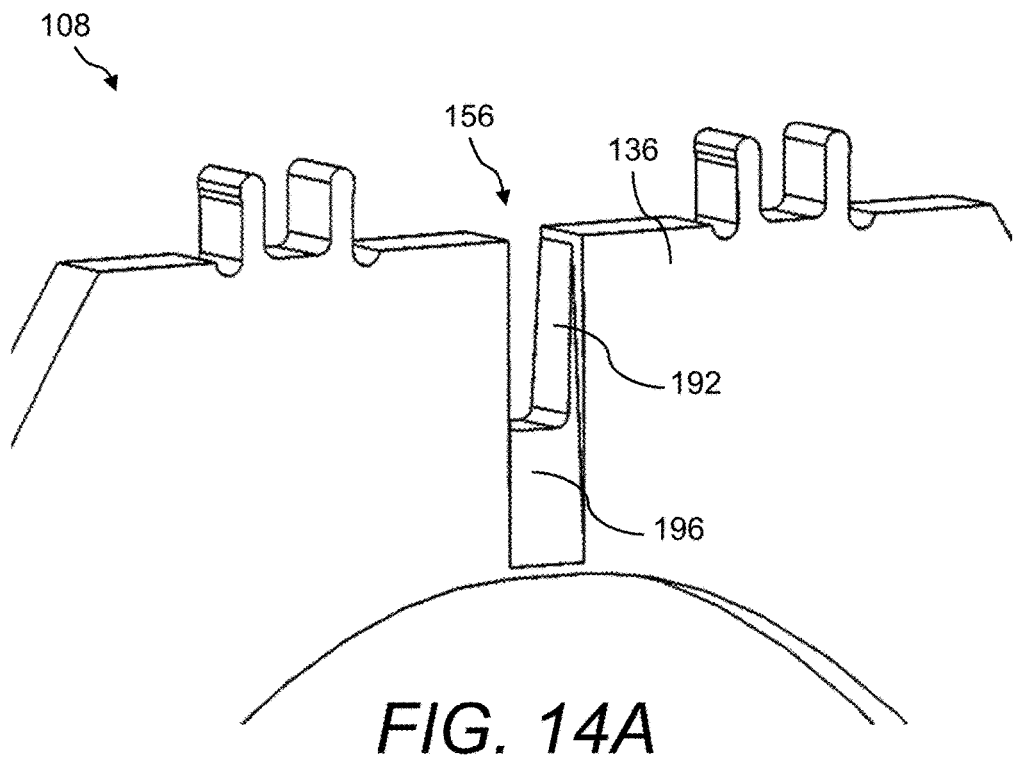
FIG. 14A is a perspective view of the front of an upper portion of the exemplary second support member shown in FIG. 10.
Figures 1, 14B:
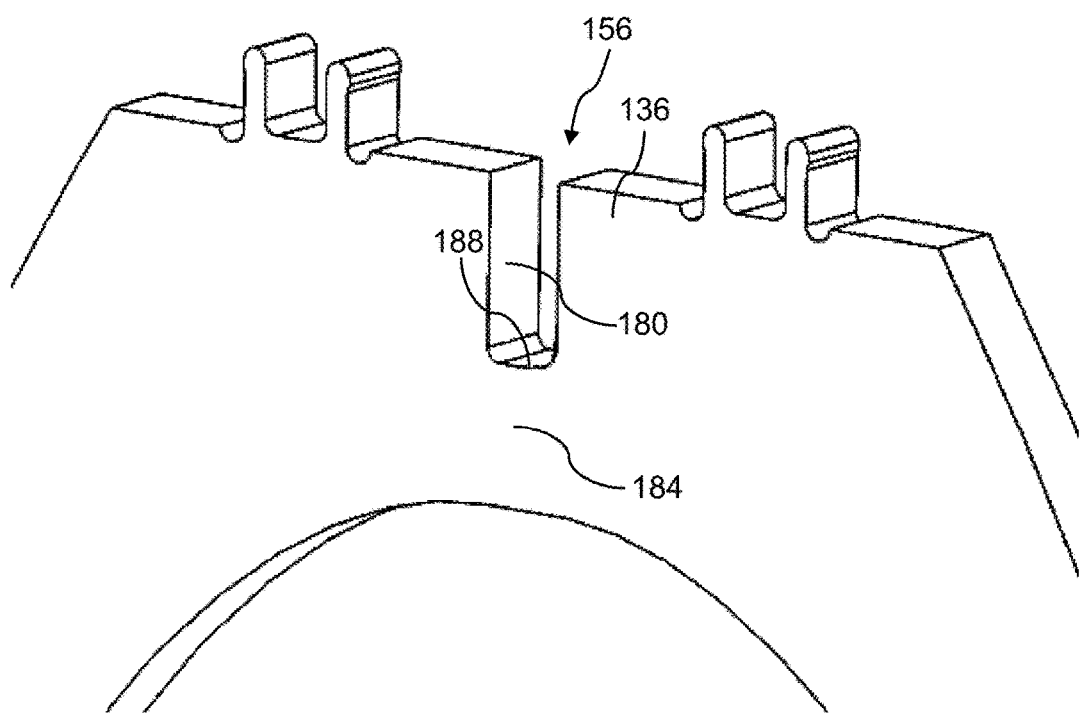
Figures 2, 14B:
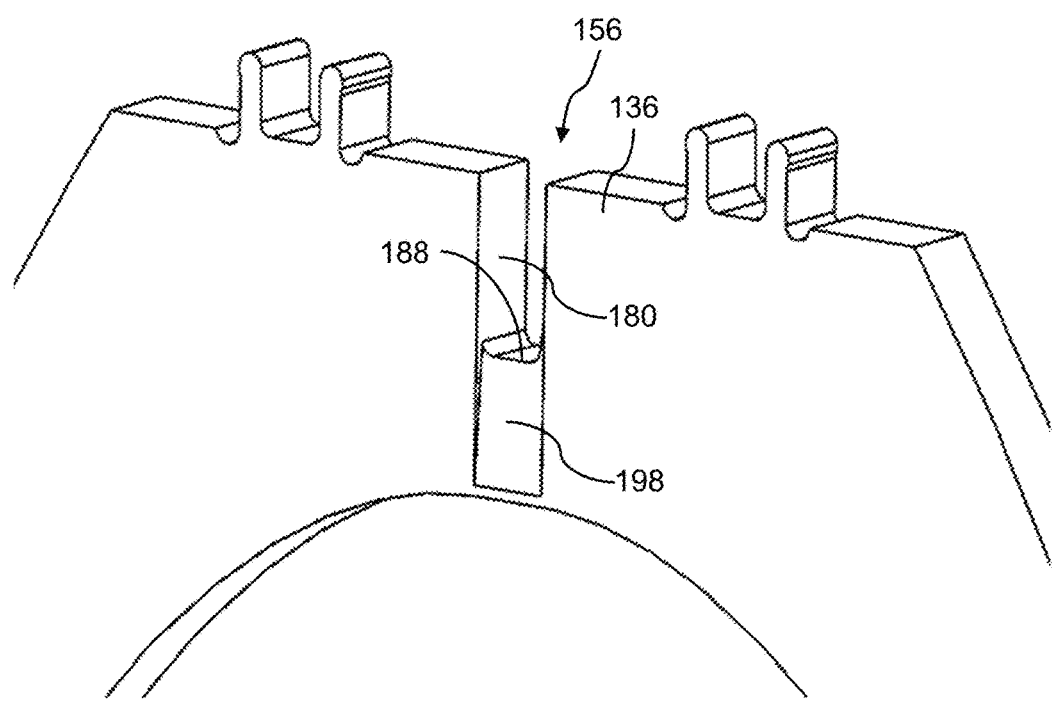
Figure 15:
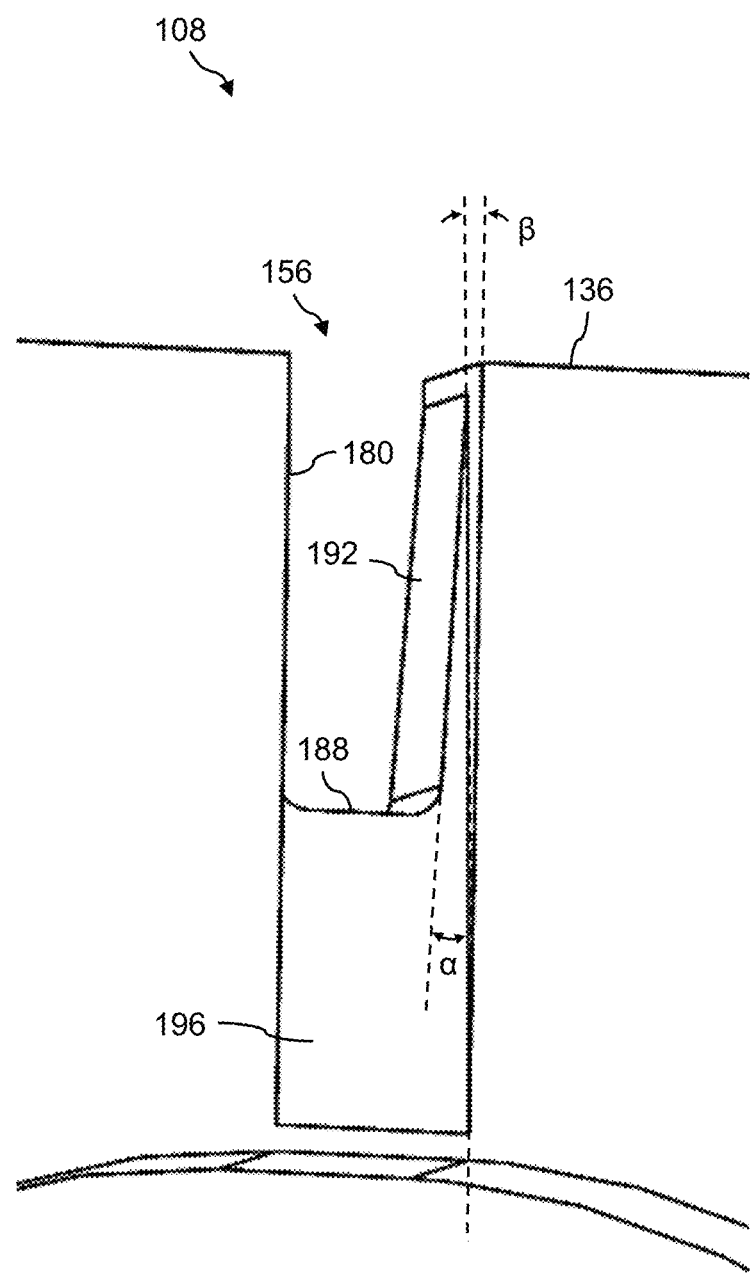
FIG. 15 is another perspective view of an upper portion of the exemplary second support member shown in FIG. 10.

FIGS. 10 to 11E are various views of an exemplary second support member 108. FIGS. 14A, 14B, and 15 are enlarged perspective views of an upper portion of second support member 108, with a focus on upward-facing slot 156.

An exemplary downward-facing slot 152 is shown in more detail in FIGS. 12A, 12B-1, and 13 and an exemplary upward-facing slot is 156 is shown in more detail in FIGS. 14A, 14B-1, and 15. At a high level, downward-facing slot 152 and upward-facing slot 156 each include a plurality of cooperating tapered faces that provide a tight friction fit when first support member 104 and second support member 108 are coupled together. In a preferred embodiment, the intersecting joint 112 formed by the mating of two tapered faces on downward-facing slot 152 and two corresponding tapered faces on upward-facing slot 156 does not require fasteners or glue in order to prevent movement of the intersecting joint or to prevent separation of the intersecting joint.

In an exemplary embodiment, downward-facing slot 152 is a bi-tapered structure. As shown in FIGS. 12A, 12B-1, and 13, downward-facing slot defined by an un-tapered inside face 160, an un-tapered side face 164 (best seen in FIG. 12B-1), a top face 168, an inside tapered face 172, a side tapered face 176 (side tapered face being formed in an upper part of cross-section 124). Inside tapered face 172 has a tapered angle $\alpha$ that can be from about 45 degrees to about 0.001 degrees, and is more preferably between about 10 degrees to about 2 degrees. Side tapered face 176 has a tapered angle $\beta$ that can be from about 45 degrees to about 0.001 degrees, and is more preferably between about 10 degrees to about 2 degrees. Together, inside tapered face 172 and side tapered face 176 provide a bi-tapered structure (also referred to herein as two tapered regions) in downward-facing slot 152 that mates with upward-facing slot 156 to couple first support member 104 and second support member 108.

Figure 2:
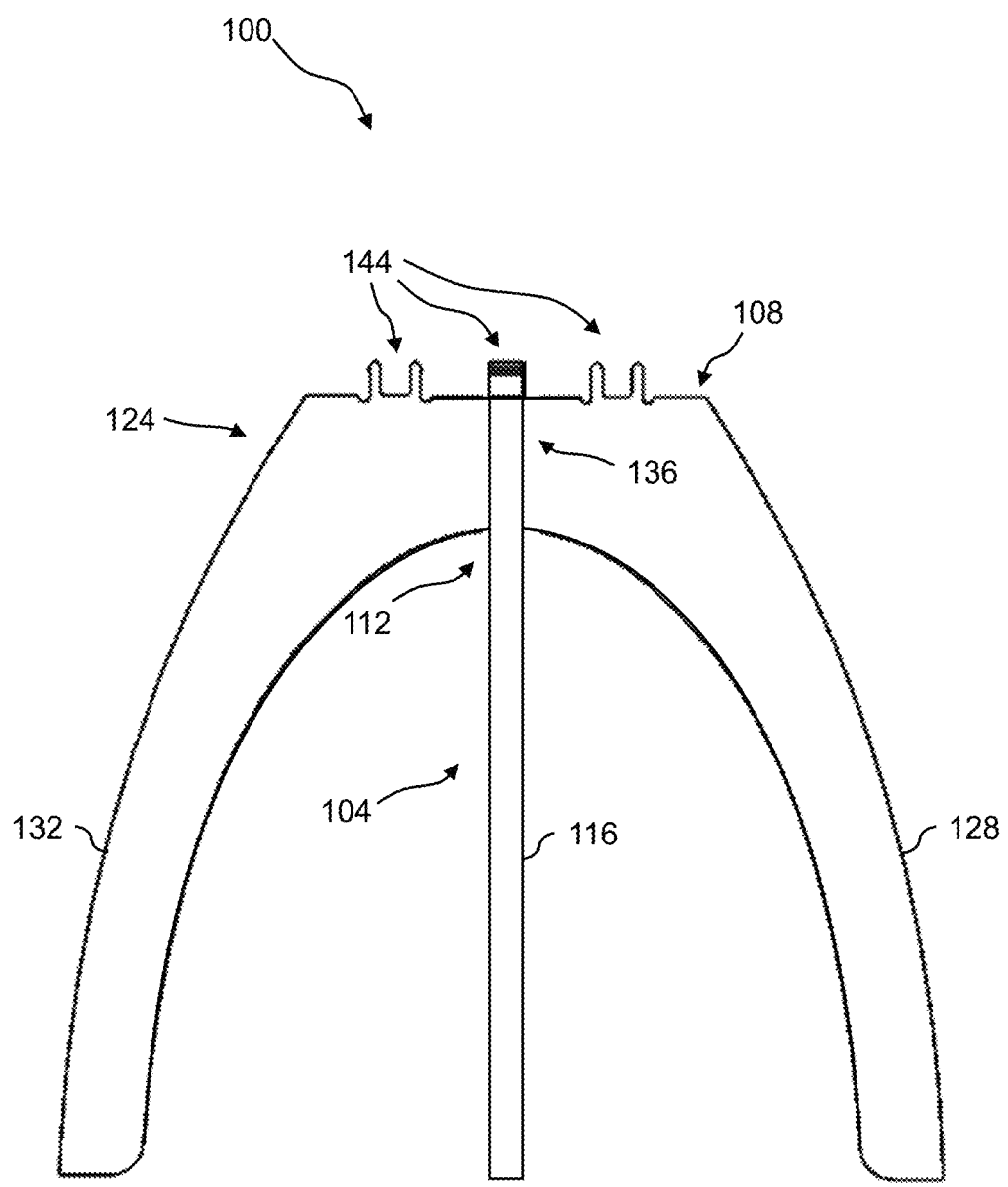
FIG. 2 is a side plan view of an exemplary support assembly according to an embodiment of the present invention.
Figure 3:
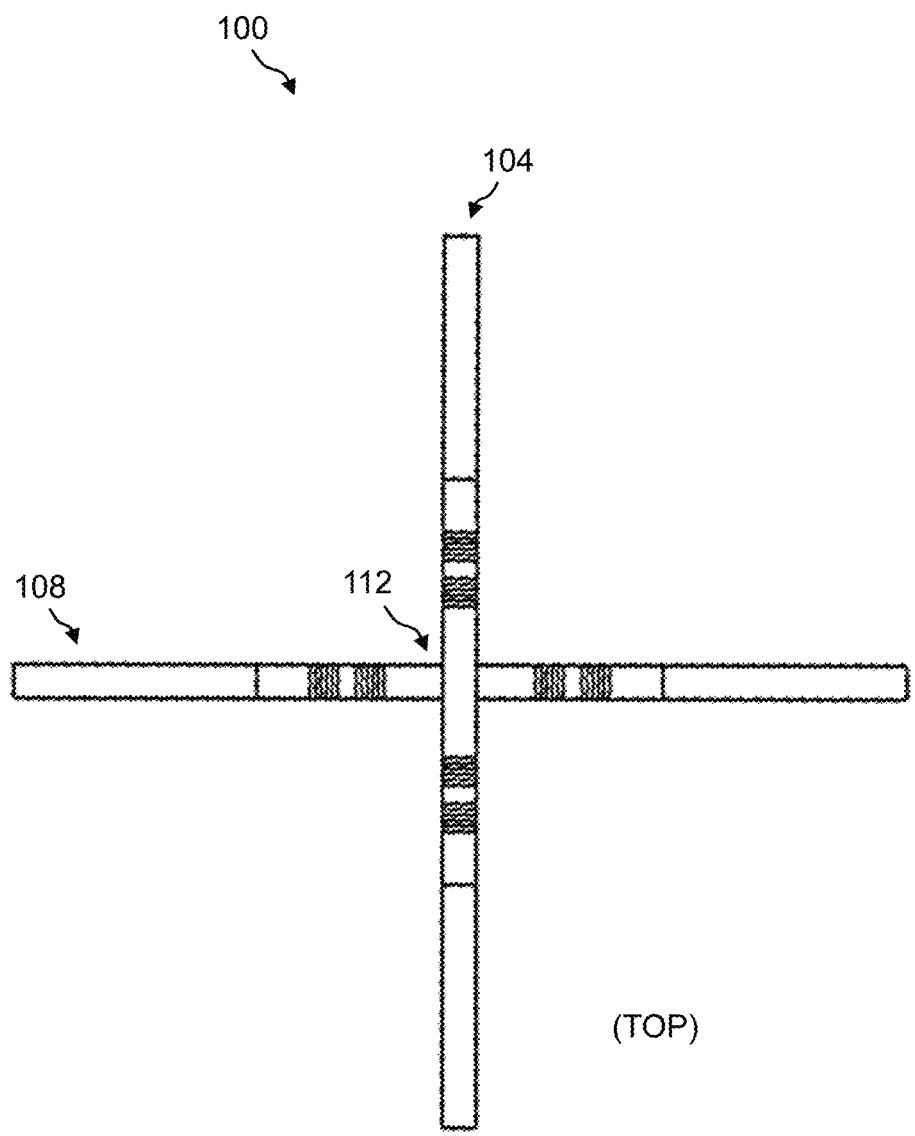
FIG. 3 is a top plan view of an exemplary support assembly according to an embodiment of the present invention.
Figure 4:
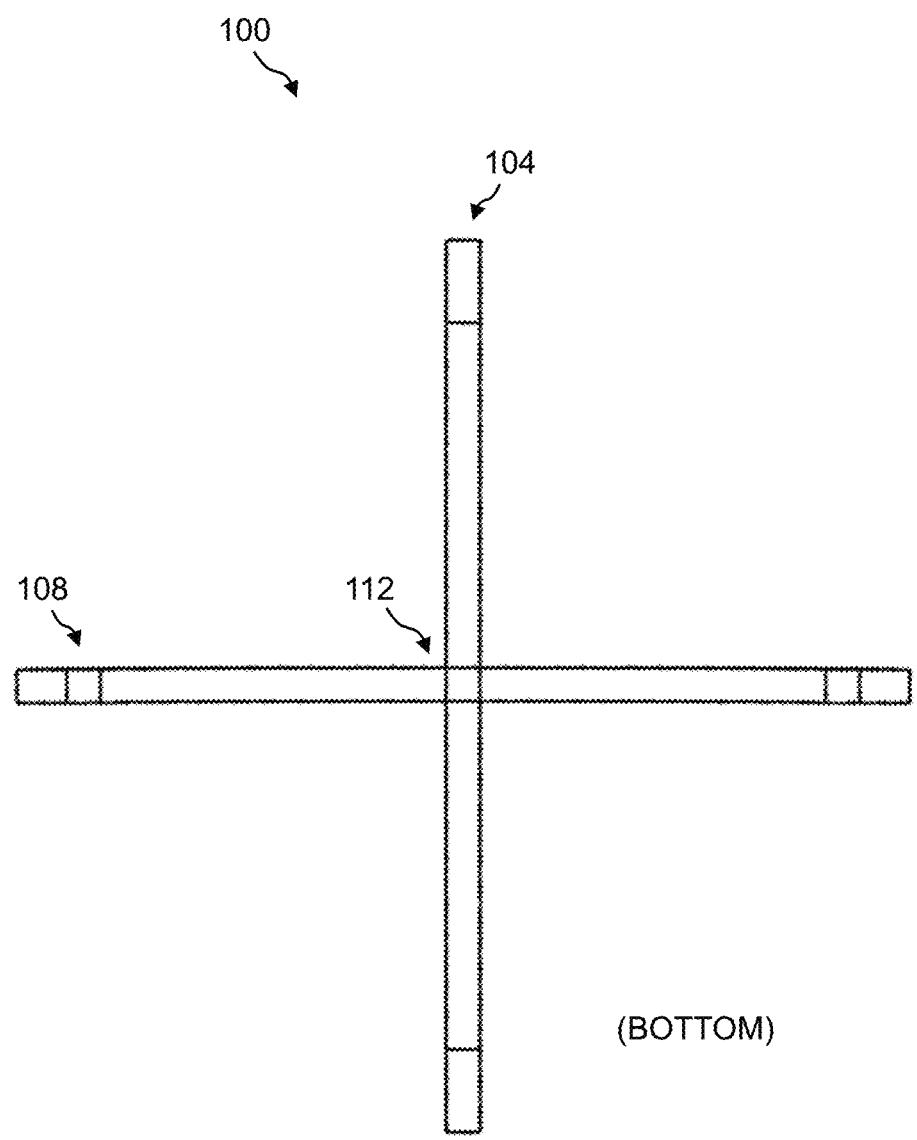
FIG. 4 is a bottom plan view of an exemplary support assembly according to an embodiment of the present invention.

In another exemplary embodiment, downward-facing slot 152 can be a tri-tapered structure. In this embodiment, downward-facing slot 152 includes a second side tapered face 178 instead of un-tapered side face 164 (as shown in FIG. 12B-2). Generally, second side tapered face 178 has a tapered angle equal to side tapered face 176, although it is understood that third tapered face and second tapered face may have different tapered angles. Together, inside tapered face 172, side tapered face 176, and second side tapered face 178 provide a tri-tapered structure (also referred to herein as three tapered regions) in downward-facing slot 152 that can mate with a similarly configured upward-facing slot 156 (described in more detail below) to couple first support member 104 and second support member 108.

Referring now to FIGS. 14A, 14B-1, and 15, there is shown close-up perspective views of an exemplary upward-facing slot 156 in cross-member 136. As with downward-facing slot 152, upward-facing slot 156 features tapered faces or walls to provide a wedge effect that ensures a tight friction fit when second support member 108 and first support member 104 are fitted together. Upward-facing slot 156 is defined by an un-tapered inside face 180, an un-tapered side face 184 (best seen in FIG. 14B-1), a bottom face 188, an inside tapered face 192, and a side tapered face 196 (the side tapered face being formed in part of cross-section 128). The angles associated with each of the tapered faces for upward-facing slot 156 are generally sized and configured to cooperate with the tapered angles found in the mating slots in downward-facing slot 152. Thus, inside tapered face 192 can have a tapered angle $\alpha$ that can be from about 45 degrees to about 0.001 degrees, and is more preferably between about 10 degrees to about 2 degrees. Side tapered face 192 has a tapered angle $\beta$ that can be from about 45 degrees to about 0.001 degrees, and is more preferably between about 10 degrees to about 2 degrees. Together, inside tapered face 192 and side tapered face 196 provide a bi-tapered structure (also referred to herein as two tapered regions) in upward-facing slot 156 that mates with downward-facing slot 152 to couple first support member 104 and second support member 108.

In another exemplary embodiment, upward-facing slot 156 can be a tri-tapered structure. In this embodiment, upward-facing slot 156 has a second side tapered face 198 (as seen in FIG. 14B-2). Generally, second side tapered face 198 has a tapered angle equal to side tapered face 192, although, it is understood that second side tapered face and side tapered face may have different tapered angles. Together, inside tapered face 192, side tapered face 196, and second side tapered face 198 provide a tri-tapered structure (also referred to herein as three tapered regions) in upward-facing slot 156 that can mate with a similarly configured downward-facing slot 152 (as described above) to couple first support member 104 and second support member 108.

Figure 16:
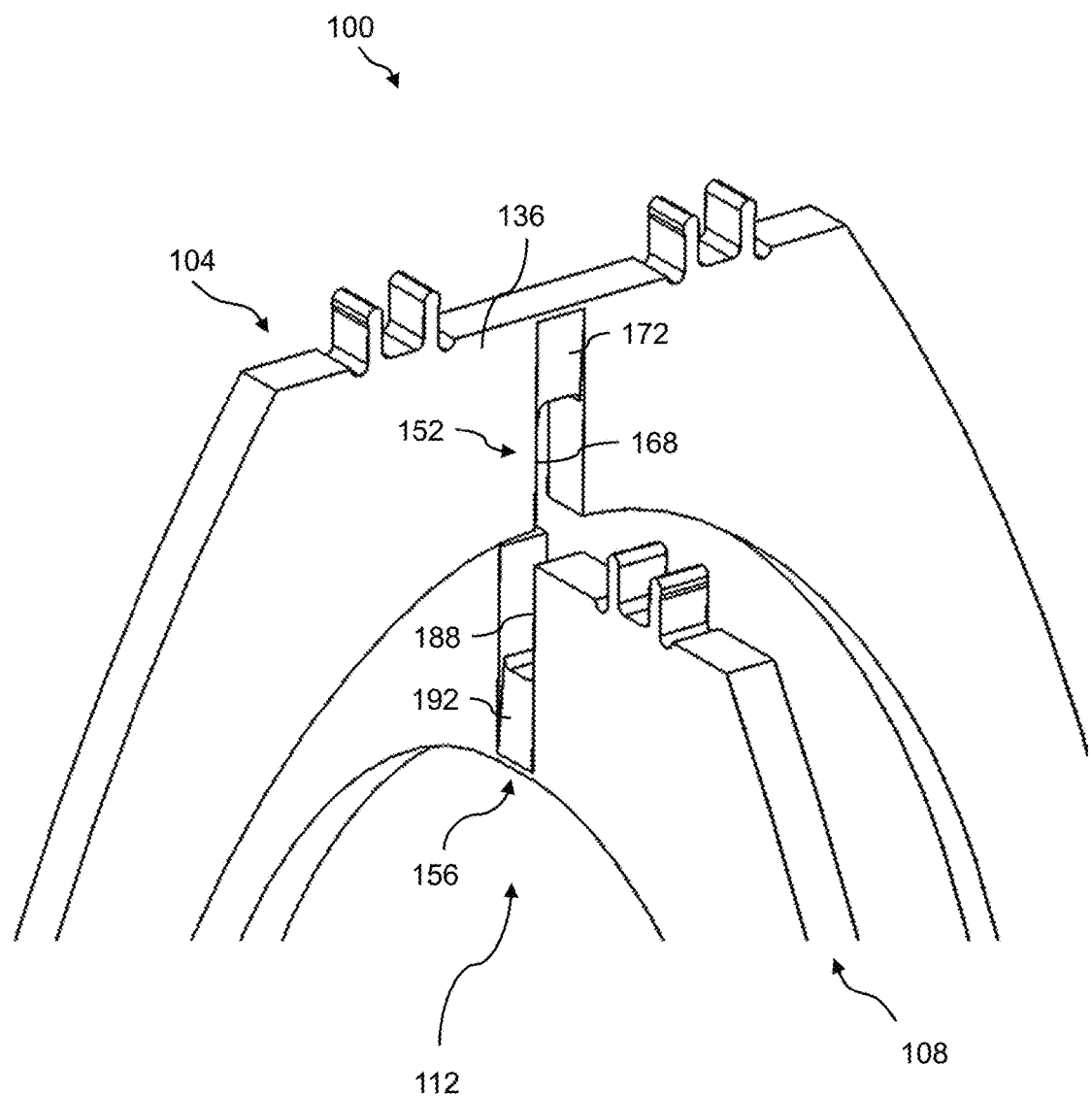
FIG. 16 is a perspective view showing an upper portion of a first support member in relation to an upper portion of a second support member according to an embodiment of the present invention.

Referring now to FIG. 16, there is shown a close-up perspective view showing downward-facing slot 152 of first support member 104 in relation to upward-facing slot 156 of second support member 108 with each of the support members having a bi-tapered structure as described above. When first support member 104 and second support member 108 are fitted together, inside tapered face 172 of downward-facing slot 152 of first support member 104 is fitted against side tapered face 196 of upward-facing slot 156 of second support member 108. Further, inside tapered face 192 of upward-facing slot 156 of second support member 108 is fitted against side tapered face 176 of downward-facing slot 152 of first support member 104. As downward-facing slot 152 of first support member 104 and upward-facing slot 156 of second support member 108 are engaged, the fit becomes more and more snug or tight due to the tapered faces up until full engagement is achieved (typically when top surface 168 abuts bottom surface 188), wherein full engagement is as shown in FIG. 1. The compression fit of downward-facing slot 152 of first support member 104 with upward-facing slot 156 of second support member 108 is sufficient alone to provide a stiff, strong joint without the need, for example, for glue or fasteners.

In another exemplary embodiment, when downward-facing slot 152 and upward-facing slot 156 each include tri-tapered structure as described above, the fit between first support member 104 and second support member 108 is assisted by the fitting together of second side tapered face 198 of the second support member and un-tapered inside face 160 of the first support member and the fitting together of second side tapered face 178 of the first support member and the un-tapered inside face 180 of the second support member. The addition of the second tapered side faces on each support member can lend additional resistance to movement of the two support members relative to each other, again without the need for glue or fasteners.

Further, the joint features (i.e., tapered faces of downward-facing slot 152 and upward-facing slot 156) of intersecting joint 112 can be used in other furniture making applications, such in making bed frames, cabinets, plant holders, and the like. Moreover, a support structure may include more than one slot. For example, an exemplary support assembly could have four support structures with each support structure having a slot at the each end of each support structure. In this way the four support members can be joined to form a polygonal structure, such as a bedframe or square/rectangular furniture base. In essence, any number of support structures can be used and the location of the slots can vary so as to form many different furniture assemblies. The explanation above, with reference to a chair or stool configuration, is for exemplary purposes only.

Figure 17A:
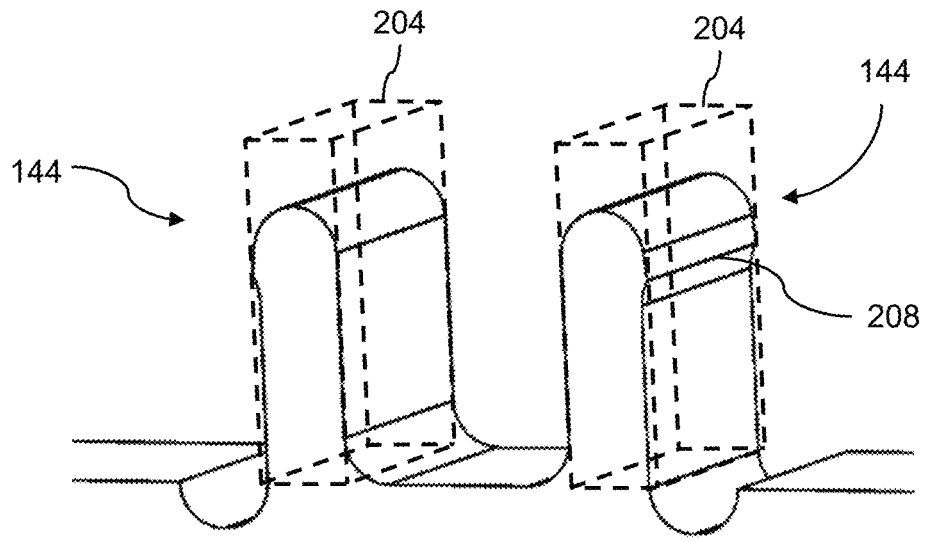
FIG. 17A and FIG. 17B are perspective views of exemplary attachment features and receiving features suitable for use with a support assembly according to an embodiment of the present invention.
Figure 17B:
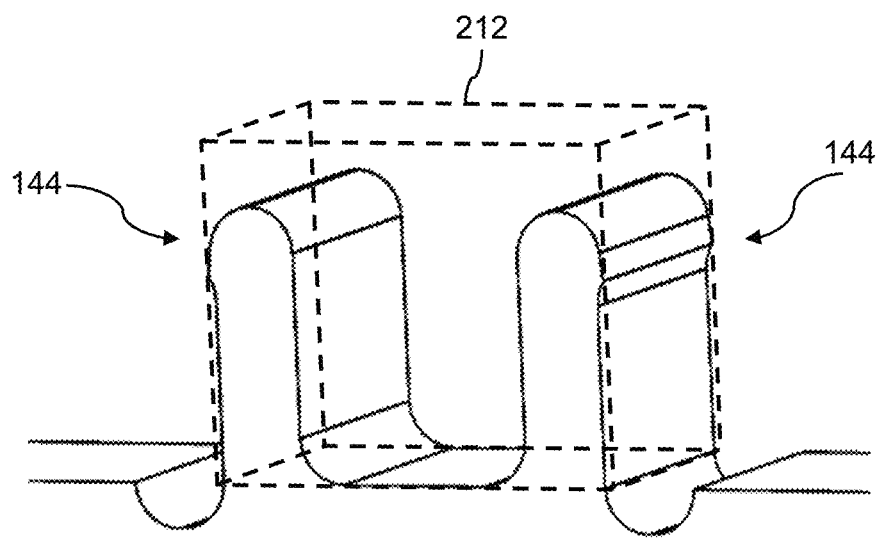

FIG. 17A and FIG. 17B are close-up perspective views of attachment features 144 of support assembly 100 in relation to examples of receiving features of the item or member to be supported by support assembly 100. For example, FIG. 17A shows receiving features 204, which can be a slot feature in the item or member to be supported by support assembly 100. In this example, each attachment feature 144 has its own corresponding receiving feature 204. Receiving features 204 are sized according to the size and/or geometry of attachment features 144 and may include a latch 208 so as to maintain the connection between the attachment feature and the receiving feature. In another example, FIG. 17B shows a receiving feature 212 that is designed to receive the pair of attachment features 144, which, in this embodiment, may have resiliency so as to maintain the connection between the attachment features and the corresponding receiving features. That is, receiving feature 212 is an enlarged slot compared to receiving features 204 of FIG. 17A, wherein receiving feature 212 is sized to receive the two paired attachment features 144.

Figure 18:
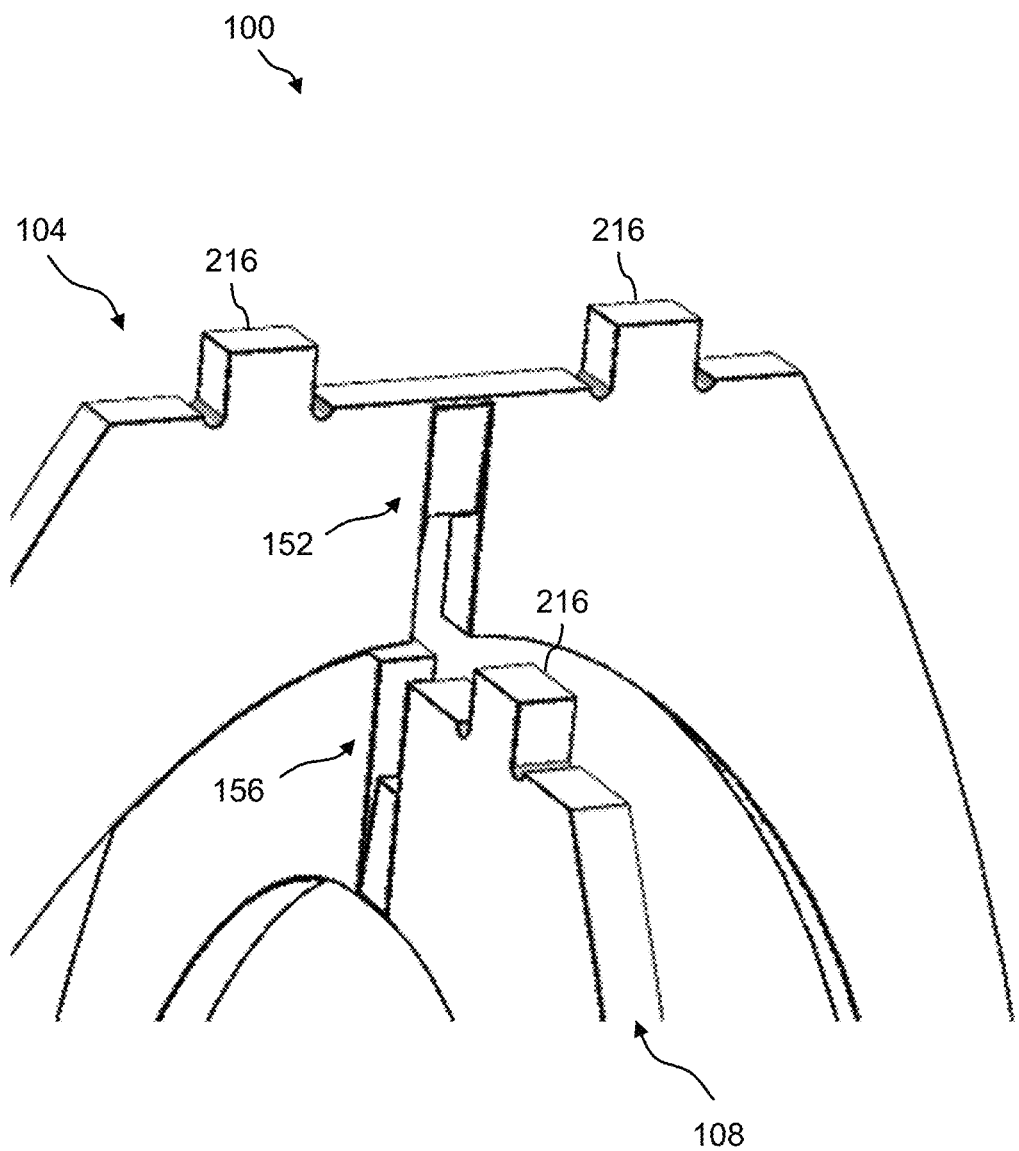
FIG. 18 is another perspective view of exemplary attachment features according to an embodiment of the present invention.

FIG. 18 is a perspective view showing another example of the attachment features, attachment features 216, of support assembly 100. In this example, instead of a pair of narrow finger-like attachment features 144, larger block-like attachment features 216 are provided. Receiving feature 212 as shown in FIG. 17B may be well suited for use with these larger block-like attachment features 216.

Figure 19A:
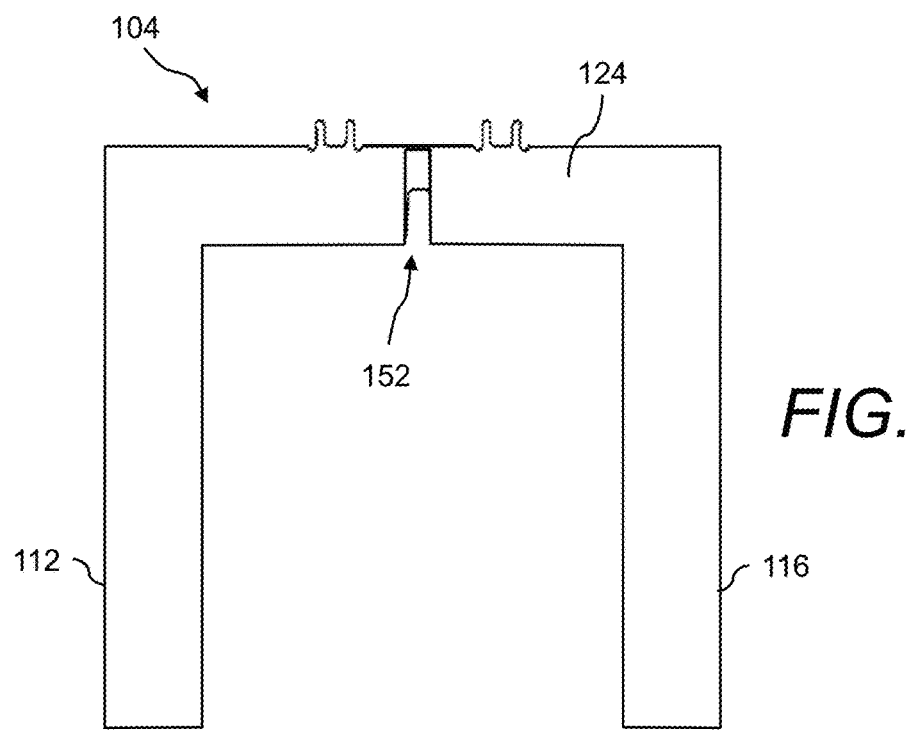
FIG. 19A and FIG. 19B are front plan views exemplary first and second support members, respectively, according to another embodiment of the present invention.
Figure 19B:
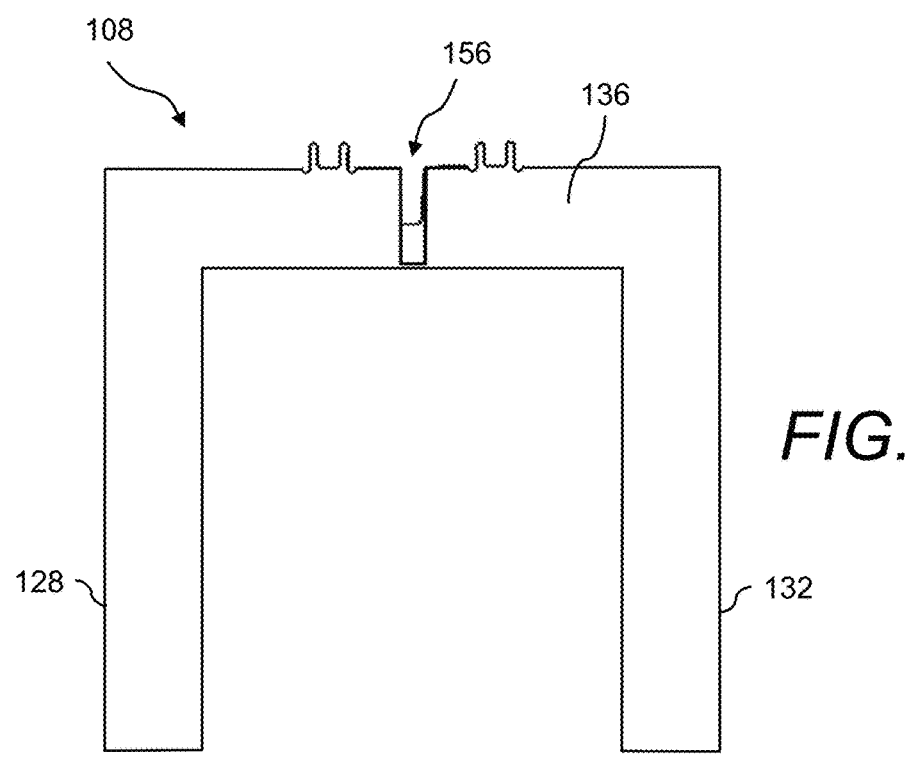

The presently disclosed support assembly 100 is not limited to arch-shaped support members as shown and described herein. The support members can be any shape suitable for supporting an item or member, such as, but not limited to, arch-shaped, reversed U-shaped, wicket-shaped, and the like. For example, FIGS. 19A and 19B show front views of an example of a wicket-shaped first support member 104 and a wicket-shaped second support member 108, respectively.

Figure 20:
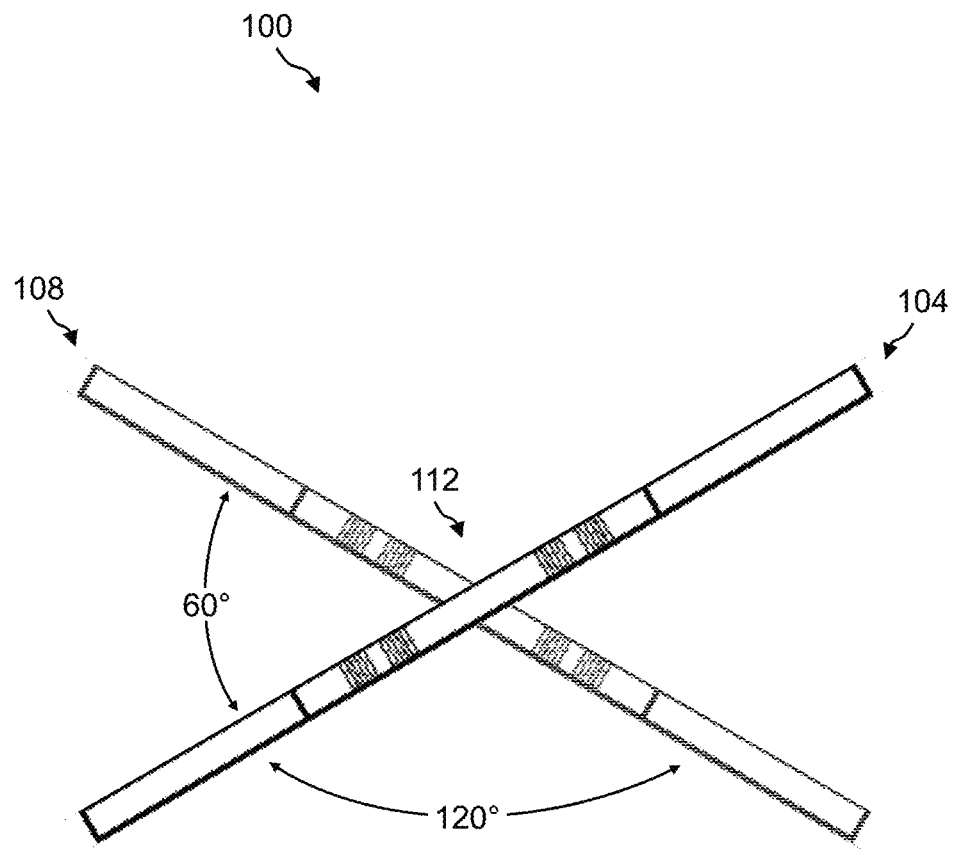
FIG. 20 is a top plan view of another support assembly having a non-perpendicular configuration according to an embodiment of the present invention.

Additionally, the cross configuration of the presently disclosed support assembly 100 is not limited to a 90-degree relationship of first support member 104 and second support member 108 as shown and described herein. Other angles are possible by tailoring the sidewalls of downward-facing slot 152 of first support member 104 and of upward-facing slot 156 of second support member 108. For example, FIG. 20 shows a top view of another example configuration of first support member 104 and second support member 108 that is something other than 90-degrees. In this embodiment, one or more of the tapered faces discussed above with respect to downward-facing slot 152 and upward-facing slot 156 may also include a bevel so as to accommodate the angle of the connection between first support member 104 and second support member 108.

Figure 21:
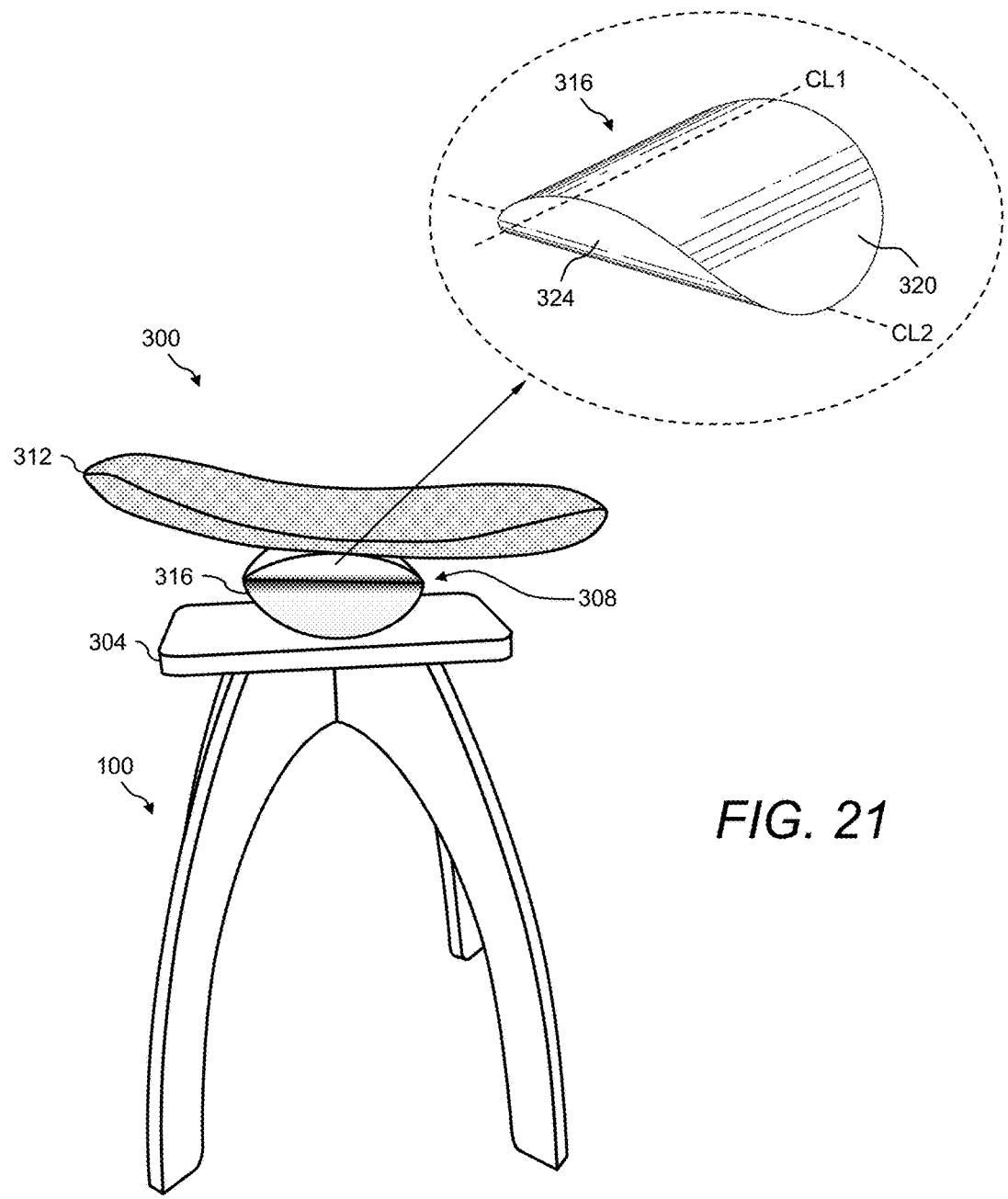
FIG. 21 is a perspective view of an example of an exercise chair that uses an exemplary support assembly according to an embodiment of the present invention.

Turning now to FIG. 21, there is shown an exemplary embodiment of support assembly 100 in use. More particularly, FIG. 21 shows a perspective view of an exemplary exercise chair 300 that is formed using a support assembly with an intersecting joint, such as support assembly 100.

Exercise chair 300 includes a base plate (or platform) 304 that sits atop and is coupled to support assembly 100. Base plate 304 can be, for example, a wood or wood laminate platform. The underside of base plate 304 includes receiving features, such as slots (not shown), to which attachment features 144 of first support member 104 and second support member 108 can engage. In one example, attachment features 144 can be resilient, such that they can be snap-fitted into the receiving features (e.g., slots (not shown)) of base plate 304.

Further, exercise chair 300 can also include a rocking mechanism 308 arranged between base plate 304 and a seat 312. In this example, rocking mechanism 308 includes a pair of eccentric bicylinder rocking members 316. Each of the eccentric bicylinder rocking members 316 includes a first surface 320 and a second surface 324 arranged in an eccentric bicylinder shape as shown. More particularly, FIG. 21 shows that eccentric bicylinder rocking mechanism 316 has a first contact line (CL1) that runs along the apex of surface 320 and a second contact line (CL2) that runs along the apex of surface 324. In exercise chair 300, eccentric bicylinder rocking mechanism 316 is arranged, for example, such that the second contact line (CL2) of eccentric bicylinder rocking member 316 is oriented substantially perpendicular to first contact line (CL1). Seat 312 can be fastened along the first contact line (CL1) and base plate 304 can be fastened along the second contact line (CL2) of eccentric bicylinder rocking member 316, thereby allowing seat 312 to rock, wobble, and/or swivel with a side-to-side rocking motion, a front-to-back rocking motion, or both a side-to-side rocking motion and a front-to-back rocking motion.

In another exemplary embodiment, exercise chair 300 can include one half of the eccentric bicylinder rocking mechanism 316 only, such that the eccentric bicylinder rocking mechanism has a flat bottom side (not shown). In this embodiment, seat 312 is fastened along the first contact line (CL1) and base plate 304 is fastened to the flat bottom side of the eccentric bicylinder rocking mechanism 316. In yet another exemplary embodiment, rocking mechanism 308 is a hollow or solid hemispheric- or dome-shaped rocking mechanism. In yet a further exemplary embodiment, rocking mechanism 308 can be an arrangement of halfpipe members.

In another exemplary embodiment, aspects of exercise chair 300 can be based upon the exercise chair described in U.S. patent application Ser. No. 14/947,675, entitled "Exercise Chair," filed on Nov. 20, 2015, which includes a rocking assembly that further includes a rocking mechanism that sits between a base plate or platform and a seat, and is incorporated by reference for its discussion of the same.

A support assembly 100 as discussed herein can also be added to by other features known in the art; for example, wheels or casters, foot rest bars, and shelves (none of the aforementioned shown) can be added to the legs of the support assembly to increase utility of the support assembly.

While the support assembly joint described herein has been placed in the context of the construction of furniture, there are many other applications for the support assembly joint where a strong connection between two items is needed and it is preferred (or necessary) that fasteners or adhesives not be used. These applications can include, but are not limited to, nanotechnology structures (fastening, joining, connecting and fusing of nanostructures that are too small for mechanical fasteners), architecture materials (e.g., beams, members, bridge components, for use in, for example, timber frame houses, modular metal structures, etc.), construction materials (e.g., concrete castings, iron fittings), tooling, machinery, and construction equipment (e.g., quick disconnects, power transmission equipment, driveshafts), injection molded plastic products (replacing lips, tabs, hooks, and bulge features currently employed), automobile (driveshafts, connects to trailers and other towable items), aerospace, and other transportation related parts, electronic equipment such as contacts and sockets, storage applications (e.g., support structures for containers, shelving, organizers), cookware (connecting handles to pots and pans), packing materials such as cardboard containers, safety equipment (e.g., stacking, nesting gear, road barriers).

The size and/or materials of construction of the presently disclosed support assembly 100 can vary depending on the item or member to be supported, wherein the overall size and/or weight of the item or member to be supported can be considered.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A support assembly comprising:
  a first support member including a first slot, the first slot including a first aperture region, a first tapered region, and a second tapered region, wherein the first aperture region extends through the first support member, wherein the first tapered region abuts the second tapered region, and wherein the second tapered region is disposed only within the first aperture region; and
  a second support member including a second slot, the second slot including a second aperture region, a third tapered region, and a fourth tapered region, wherein the second aperture region extends through the second support member, wherein the third tapered region abuts the fourth tapered region, and wherein the fourth tapered region is disposed only within the second aperture region, and
  wherein assembly of the first slot and the second slot results in an intersecting joint capable of resisting lateral and rotation movement of the first support member and the second support member relative to one another.

2. A support assembly according to claim 1, wherein assembly of the first slot and the second slot is completed without tools, adhesives, or fasteners.

3. A support assembly according to claim 1, wherein the first tapered region is disposed on a face of the first support member and wherein the third tapered region is disposed on a face of the second support member.

4. A support assembly according to claim 3, wherein assembly of the first slot and the second slot results in the first tapered region being disposed proximate the fourth tapered region.

5. A support assembly according to claim 1, wherein the first tapered region has a taper angle of about 45 degrees to about 0.001 degrees.

6. A support assembly according to claim 5, wherein the first tapered region has a taper angle of about 10 degrees to about 2 degrees.

7. A support assembly according to claim 1, wherein the second tapered region has a taper angle of about 45 degrees to about 0.001 degrees.

8. A support assembly according to claim 7, wherein the second tapered region has a taper angle of about 10 degrees to about 2 degrees.

9. A support assembly according to claim 1, wherein the first support member includes a fifth tapered region, the fifth tapered region being disposed on a face of the first support member that is opposite the first tapered region.

10. A support assembly according to claim 9, wherein the second support member includes a sixth tapered region, the sixth tapered region being disposed on a face of the second support member that is opposite the third tapered region.

11. A support assembly according to claim 10, wherein the first support member additionally includes a non-tapered region and wherein assembly of the first slot and the second slot results in the non-tapered region residing proximate the sixth tapered region of the second support member.

12. A support assembly according to claim 1, wherein the first support member includes a plurality of first slots.

13. A support assembly according to claim 1, wherein the first support member includes at least one attachment feature.

14. A support assembly according to claim 13, further including a base plate having at least one receiving port and wherein the at least one attachment feature is sized and configured to cooperatively mate with the at least one receiving port.

15. A support assembly according to claim 1, wherein the first support member and the second support member are part of a flat-pack support assembly.

16. A support assembly according to claim 1, further including a base plate, a rocking mechanism, and a seat, and wherein the base plate is coupled to the first support member and second support member.

17. A support assembly according to claim 16, wherein said rocking mechanism is an eccentric bicylinder.

18. A support assembly according to claim 16, wherein said rocking mechanism is half of an eccentric bicylinder.

19. A chair comprising:
- a first support member including a first slot, the second slot including a first tapered region and a second tapered region, wherein the first tapered region abuts the second tapered region;
- a second support member including a second slot, the second slot including a third tapered region and a fourth tapered region, wherein the third tapered region abuts the fourth tapered region, wherein assembly of the first slot and the second slot results in an intersecting joint capable of resisting lateral and rotation movement of the first support member and the second support member relative to one another;
- a base plate coupled to the first support member and the second support member;
- a seat for a user;
- a rocking mechanism coupled to the base plate and the seat, the rocking mechanism capable of inducing lateral, longitudinal, and transverse deflection of the seat when in use by the user; and
- a fastener coupling the base plate to the rocking mechanism, wherein at least a portion of the fastener is made from elastomeric materials so as to assist in the motion of the rocking assembly.

20. A chair according to claim 19, wherein assembly of the first slot and the second slot results in the first tapered region residing proximate the third tapered region.

21. A chair according to claim 19, wherein the first tapered region has a taper angle of about 45 degrees to about 0.001 degrees.

22. A chair according to claim 19, wherein the first tapered region has a taper angle of about 10 to about 2.

23. A chair according to claim 19, wherein the first tapered region is disposed on a face of the first support member and wherein the third tapered region is disposed on a face of the second support member.

24. A chair according to claim 23, wherein the first support member includes a fifth tapered region, the fifth tapered region being disposed on a face of the first support member that is opposite the first tapered region.

25. A chair according to claim 24, wherein the second support member includes a sixth tapered region, the sixth tapered region being disposed on a face of the second support member that is opposite the third tapered region.

26. A chair according to claim 25, wherein the first support member additionally includes a non-tapered region and wherein assembly of the first slot and the second slot results in the non-tapered region residing proximate the sixth tapered region of the second support member.

27. A chair according to claim 19, wherein the first support member includes a plurality of first slots.

28. A chair according to claim 19, wherein said rocking mechanism is an eccentric bicylinder.

29. A chair according to claim 19, wherein said rocking mechanism is half of an eccentric bicylinder.

30. A support assembly comprising:
- a first support member having a first top surface, a first bottom surface, and first opposing side surfaces, the first support member including:
  - a first aperture extending through the first opposing side surfaces and the first top surface,
  - a first tapered region within the first aperture,
  - a second tapered region abutting the first tapered region, the second tapered region having a length that is greater than the first tapered region, and
  - a first un-tapered region opposite the first tapered region and within the first aperture; and
- a second support member having a second top surface, a second bottom surface, and second opposing side surfaces, the second support member including:
  - a second aperture extending through the second opposing side surfaces and the second bottom surface,
  - a third tapered region within the second aperture,
  - a fourth tapered region abutting the third tapered region, the fourth tapered region having a length that is greater than the third tapered region, and
  - a second un-tapered region opposite the third tapered region and within the second aperture, and
- wherein assembly of the first slot and the second slot results in the first tapered region engaging only a portion of the fourth tapered region and the third tapered region engaging only a portion of the second tapered region.

\* \* \* \* \*

UNITED STATES PATENT AND TRADEMARK OFFICE
CERTIFICATE OF CORRECTION

PATENT NO. : 9,874,237 B1  
APPLICATION NO. : 15/275626  
DATED : January 23, 2018  
INVENTOR(S) : Turner Osler et al.

It is certified that error appears in the above-identified patent and that said Letters Patent is hereby corrected as shown below:

In the Specification

Column 1, Line 16 – replace "assembly" with -- Assembly --

Column 1, Line 21 – remove "a"

Column 1, Line 47 – replace "an" with -- a --

Signed and Sealed this  
Tenth Day of April, 2018

Andrei Iancu  
*Director of the United States Patent and Trademark Office*